United States Patent
Koos et al.

(10) Patent No.: US 9,976,843 B2
(45) Date of Patent: May 22, 2018

(54) MULTISCALE DISTANCE MEASUREMENT WITH FREQUENCY COMBS

(71) Applicant: KARLSRUHER INSTITUT FÜR TECHNOLOGIE, Karlsruhe (DE)

(72) Inventors: Christian Koos, Siegelsbach (DE); Claudius Weimann, Oppenweiler (DE); Juerg Leuthold, Walzbachtal (DE)

(73) Assignee: KARLSRUHER INSTITUT FÜR TECHNOLOGIE, Karlsruhe (DE)

( * ) Notice: Subject to any disclaimer, the term of this patent is extended or adjusted under 35 U.S.C. 154(b) by 949 days.

(21) Appl. No.: 14/371,873

(22) PCT Filed: Jan. 23, 2013

(86) PCT No.: PCT/EP2013/000204
§ 371 (c)(1),
(2) Date: Nov. 10, 2014

(87) PCT Pub. No.: WO2013/113481
PCT Pub. Date: Aug. 8, 2013

(65) Prior Publication Data
US 2015/0070685 A1    Mar. 12, 2015

(30) Foreign Application Priority Data
Jan. 30, 2012  (DE) .......... 10 2012 001 754

(51) Int. Cl.
*G01P 3/36* (2006.01)
*G01B 9/02* (2006.01)
(Continued)

(52) U.S. Cl.
CPC ..... *G01B 9/02008* (2013.01); *G01B 9/02003* (2013.01); *G01B 11/005* (2013.01);
(Continued)

(58) Field of Classification Search
CPC ....... G01P 3/36; G01P 3/366; G01B 9/02008; G01B 9/02003; G01B 11/026; G01B 11/005; G01B 11/14; G01S 17/87
(Continued)

(56) References Cited

U.S. PATENT DOCUMENTS 8,363,226 B2 *   1/2013   Kuramoto .......... G01B 9/02003
                                                    356/487

FOREIGN PATENT DOCUMENTS

EP          2182319 A1    5/2010

OTHER PUBLICATIONS

PCT/EP2013/000204 Translation of the International Preliminary Report on Patentability dated Aug. 14, 2014.
(Continued)

*Primary Examiner* — Mark Hellner
(74) *Attorney, Agent, or Firm* — Banner & Witcoff, Ltd.

(57) ABSTRACT

The invention relates to a method and a corresponding apparatus for measuring distance and optionally speed, in particular for multiscale distance measurement. The method comprises generating a first and a second frequency comb signal (201, 202), wherein the first and second frequency comb signals (201, 202) have different line spacings; a reference measurement comprising superimposing the at least one part of the first frequency comb signal (201) and at least one part of the second frequency comb signal (202) in a reference beam path (103) and detecting the superimposition signal propagated by the reference beam path; a first measurement comprising superimposing at least one part of the second frequency comb signal (202) on the at least one part of the first frequency comb signal (201), injecting the superimposition signal into a measurement beam path (104) and detecting the superimposition signal propagated by the measurement beam path; and determining the path differ- (Continued)

Figure 1:
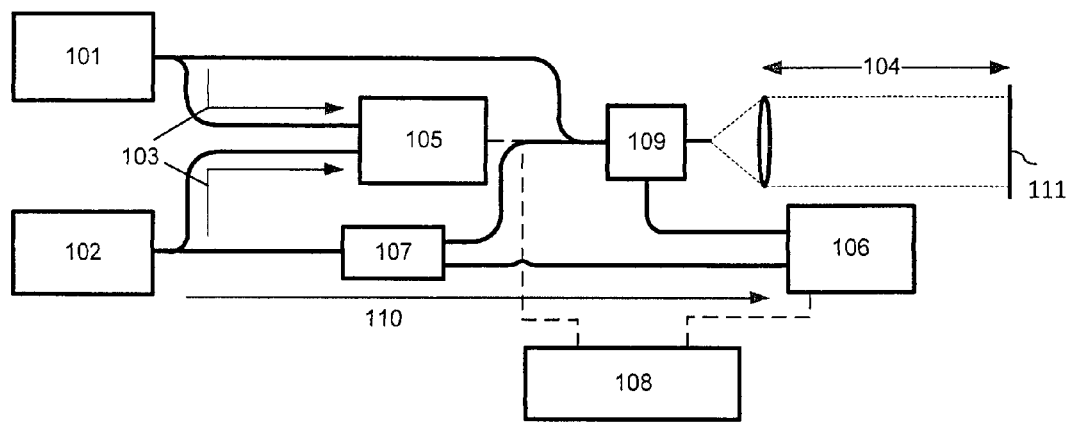

ence between the reference beam path (103) and the measurement beam path (104) from the detected superimposition signals.

23 Claims, 15 Drawing Sheets

(51) Int. Cl.
    *G01S 17/87*     (2006.01)
    *G01B 11/02*     (2006.01)
    *G01B 11/00*     (2006.01)
    *G01B 11/14*     (2006.01)

(52) U.S. Cl.
    CPC ............ *G01B 11/026* (2013.01); *G01B 11/14* (2013.01); *G01P 3/36* (2013.01); *G01P 3/366* (2013.01); *G01S 17/87* (2013.01)

(58) Field of Classification Search
    USPC ........................................................ 356/28.5
    See application file for complete search history.

(56) References Cited

OTHER PUBLICATIONS

International Search Report dated May 7, 2013 (PCT/EP2013/000204); ISA/EP.

Coddington I et al: "Rapid and precise absolute distance measurements at long range", Nature Photonics, Nature Publishing Group, UK, vol. 3, Jan. 1, 2009 (Jan. 1, 2009), pp. 351-356, XP002675765, ISSN: 1749-4885, DOI: 10.1038/NPHOTON.2009.94 Retrieved from the Internet: URL:http://www.nature.com/nphoton/journal/v3/n6/full/nphoton.2009.94.html [retrieved on May 24, 2009], cited in the application, the whole document.

\* cited by examiner

MULTISCALE DISTANCE MEASUREMENT WITH FREQUENCY COMBS

The present application is a U.S. National Phase filing of International Application No. PCT/EP2013/000204 filed on Jan. 23, 2013, designating the United States of America and claiming priority to German Patent Application No. 10 2012 001 754.5, filed on Jan. 30, 2012; and the present application claims priority to and the benefit of both of the above-identified applications, both of which are incorporated by reference herein in their entireties.

The field of the present invention is in optical measurement technology, and the invention relates to a device and a method for high-precision optical distance measurement. The invention further relates to a device and a method for high-precision optional speed measurement with frequency combs.

Methods that carry out distance measurements utilizing two precision scales are already known. The distance is thereby determined by way of interferometry in the presence of the wavelength of light on the one hand, and by way of multi-wavelength interferometry with synthetic wavelengths defined by the line distance of a comb source on the other hand. In this approach, the unambiguous range of the measurement is determined by the line spacing of the comb source and thus, is generally too marginal for many practical applications. If, for example, lasers with a repetition rate of 100 MHz are used, the result is an unambiguous range of ~1.5 m for the distance measurement. These methods also do not allow the use of miniaturized frequency comb sources, like micro-disc resonators, for example, for the distance measurement. The line spacings are here in the multi-GHz range, and would thus lead to a technically unusable unambiguous range of few millimeters. The realization of miniaturized measuring devices having the known advantages with respect to compactness, robustness, and production expenditure is therefore not possible.

In addition, the small line spacing with traditional methods leads to high requirements for the precision, with which the phases for the multi-wavelength interferometry have to be measured in order to reach the unambiguous range of the optical interferometry. The relative precision of the phase measurement is essentially given by the ratio of optical wavelength to synthetic wavelength, and with traditional methods, ranges in the order of magnitude of $10^{-6}$ (for example, optical wavelength 1.55 µm, line spacing 100 MHz). This is technically complex. However, the requirements can be drastically reduced by enlarging the line spacing, for example, to $10^{-3}$ at 1.55 µm optical wavelength and 100 GHz line spacing—provided that the problem of the reduced unambiguous range associated therewith can be solved in a different manner.

In EP 2 182 319 A1, an interferometric distance measurement method is described, which is based on using two frequency comb sources having different line spacings. The signal of the first frequency combs thereby passes through the distance to be measured, and is subsequently coherently detected with the aid of the second frequency comb. A part of the signal of the first frequency comb separated by means of beam splitters simultaneously passes through a reference distance, and is subsequently again coherently detected with the aid of the second frequency comb. The respectively measured photocurrent contains equidistant spectral components. From the relative phases of individual spectral components, the optical path length difference between the distance to be measured and the reference distance can be calculated. In this method, the unambiguous range is given by the line spacing of the first frequency comb source.

With a small line spacing (and correspondingly high unambiguous range), limiting the unambiguous range to the line spacing of the first frequency comb requires a high phase measurement accuracy in order to get into the capture range of the optical interferometry. A reduction of the phase measurement accuracy is possible by using a larger line spacing. However, this leads to a correspondingly reduced unambiguous range. In order to achieve a higher unambiguous range, the authors propose to simultaneously carry out the measurement with an additional frequency comb pair. With suitable selection of the wavelength and the line spacing, a further synthetic wavelength is generated in this way without interference with the first frequency comb pair. By measuring with two synthetic wavelengths, the unambiguous range can be correspondingly extended. However, with this method, four frequency comb sources are required. Thus, this method is technically complex and sensitive with respect to phase fluctuations of the frequency combs involved.

In "Nature Photon 3 (6), pg. 351-356, Coddington et al.," a method for quick distance measuring is described, which is based on using two frequency comb sources having different line spacings. The signal of the first frequency comb passes through the distance to be measured and is subsequently coherently detected with the aid of the second frequency comb. A semi-transparent mirror in the measurement path generates a reference signal, which is likewise detected. The respectively measured photocurrent contains equidistant spectral components for the reference signal and the measurement signal. From the frequency dependency of the relative phases, the path difference can be determined with the aid of a linear adjustment. Two longitudinal scales are thereby detected: The slope of the adjusted straight line allows the calculation of the distance according to the principle of multi-wavelength interferometry, wherein the synthetic wavelength, and thus the unambiguous range is given by the line spacing of the first frequency comb source. The absolute position of the straight line ("y-axis intercept") allows an interferometric distance measurement at the optical wavelength of the first frequency comb, if the absolute optical wavelength of the frequency comb is known. This can be done, for example, by stabilizing onto an additional laser (the wavelength of which must be known, for example, by way of an absorption cell or a self-referencing, octave-spanning frequency comb).

In this method, the unambiguous range is also limited by the line spacing of the first frequency comb. The utilized lasers having repetition rates of 100 MHz result in an unambiguous range of 1.5 m. The relatively small line spacing requires higher measuring accuracy with the phase measurement of the optical beats in order to get into the capture range of the interferometry. In order to achieve a higher unambiguous range, the authors propose a switching between the local oscillator (LO) and the signal laser. A simultaneous detection of all relevant measurement data in a single measuring process is thus not possible, which is to say that two measurements at different points in time are necessary. This results in high requirements on the stability of the frequency comb sources. Furthermore, quick measurements, for example, on moving measurement objects, are more difficult due to the measuring at different points in time. The distance measurement on a moving target described in the published material was therefore carried out within an unambiguous range of the multi-wavelength interferometry.

It is an object of the invention to provide an improved measurement method, which complements the multi-wavelength interferometry, in particular by an additional size scale with a higher unambiguous range.

The objective is achieved by a method having the characteristics as specified in claim 1, a device having the characteristics as specified in claim 11, a system for measuring spatial coordinates having the characteristics as specified in claim 22, and use with the characteristics as specified in claim 23. Preferred embodiments are the subject matter of the dependent claims.

According to a first aspect of the invention, a method for optical distance and optional speed measurement is proposed, comprising:

Generating a first and a second frequency comb signal, wherein the first and the second frequency comb signal are provided with different line spacings;

a reference measurement comprising a superimposing of at least one (first) part of the first frequency comb signal and at least one (first) part of the second frequency comb signal in a reference beam path, and detecting the superimposition signal propagated via the reference beam path (that is, via the reference route);

a first measurement comprising a superimposing of the at least one other (second) part of the first frequency comb signal with at least one other (second) part of the second frequency comb signal, coupling the superimposition signal into a measurement beam path, and detecting the superimposition signal propagated via the measurement beam path (that is, via the measuring route); and determining the path difference between the reference beam path and the measurement beam path from the detected superimposition signals in the first measurement and the reference measurement.

The measurement beam path particularly comprises the section/distance to be measured (measuring section/measuring distance), for example, the section/distance to be measured from the last component of the measurement system on the output side (the device for distance and/or speed measurement) to a stationary or moving measurement object. The reference beam path comprises the reference section, for example, the reference section to a stationary reference object.

Determining the path difference can comprise a spectral analysis of the detected superimposition signals (for example, a Fourier analysis), and determining the relative phase positions of selected spectral components of the detected superimposition signals, wherein the path difference between the reference beam path and the measurement beam path is determined from the detected relative phase positions. From the determined path difference, the distance to the measurement object can be calculated. Only signals, which are produced by means of adjacent lines of both combs, are thereby detected.

The method for distance measurement according to the invention is based on using two optical frequency combs, that is, frequency comb signals having different line spacings. In order to expand the unambiguous range, it is proposed to carry out a measurement, wherein the two frequency combs, that is, frequency comb signals are initially superimposed, and thus brought to interference. Next, the superimposed frequency combs propagate simultaneously through the section/distance to be measured (that is, through the measurement beam path), and are subsequently detected in a time-resolved manner. The electrical signal produced has thereby equidistant spectral components, the distance of which corresponds to the difference of the line spacings. The length of the section to be measured can be determined from the electrical phases of the beat signals. The unambiguous range is thereby given by the difference of the line spacings. In contrast to methods according to the state of the art, the unambiguous range is independent of the line spacings itself, and can be randomly large, even for miniaturized sources. In particular, the difference of the line spacings of the two frequency combs randomly small, even with large line spacings. In principle, an arbitrarily large unambiguous range can thus be achieved, which is decoupled from the line spacing of the individual sources.

The corresponding measurement system can therefore be miniaturized, and the precision requirements for the phase measurement of the multi-wavelength interferometry can be eased. In order to achieve the greatest possible robustness with respect to fluctuations of the frequency combs, the various size scales can preferably be captured simultaneously in one single measuring process.

The superimposition signal propagated via the measurement beam path can be superimposed with another part of the second frequency comb signal, which is not propagated via the measurement beam path, prior to detection.

In this way, a simultaneous execution of two partial measurements is possible. The first partial measurement comprises an evaluation of both frequency combs after a joint propagation via the measurement beam path. The second partial measurement comprises an evaluation of one of the two frequency combs after propagation via the measurement beam path and a superimposition with the second frequency comb, which is solely for detection. As is described in detail therebelow, it is possible to carry out a separate evaluation of both partial measurements, despite the simultaneous execution of both partial measurements.

Preferably, the method comprises a second measurement, wherein the second measurement comprises at least a coupling of the at least one part of the first frequency comb signal into the measurement beam path, superimposing of the part of the first frequency comb signal propagated via the measurement beam path with a part of the second frequency comb signal (propagated via the reference beam path), and detecting the superimposition signal.

According to the above preferred embodiment of the invention, a novel method for distance measurement is proposed, which is based on a multiscale measuring principle. This measuring principle combines in a beneficial way measuring methods having a large unambiguous range and low precision with measuring methods having a small unambiguous range, but instead high accuracy. The multi-scale nature of the distance measurement is achieved in particular by systematically utilizing the multiscale nature of the frequency components present in the superimposition signal, and the difference frequencies thereof. For multiscale distance determination, it is proposed to carry out two simultaneous or temporally separate (for example, in short succession of one another) (partial) measurements, wherein, contrary to the state of the art, during at least one of the (partial) measurements both frequency combs propagate via the route to be measured, and are subsequently detected. In this way, the unambiguous range can be enlarged.

A high measurement precision can be achieved by way of the second (partial) measurement. In this measurement, a beat signal is detected, which is produced from the superimposition, that is, interference of a frequency comb, that is, frequency comb signal propagated via the measuring section, that is, via the measurement beam path, and a locally generated reference comb, that is, reference comb signal not propagated via the measuring section. For example, the frequency comb propagated via the distance to be measured can subsequently be superimposed with a part of the second frequency comb, which is not propagated via the measuring section. In other words, the detection takes place in a heterodyne manner by superimposing two frequency combs on the detector. The superimposition signal (interference signal) delivers the distance convoluted in the smaller unambiguous range. In addition, the absolute phases of the individual optical lines can be detected from the measurement data, which allow an interferometric measuring of the distance to a measurement object at the light wave length of the frequency comb signal propagated via the measuring route. The unambiguous range is thereby defined by the line spacing of the comb that propagates via the measuring route. If the distance from the first partial measurement is already known with sufficient accuracy, the second partial measurement refines the measurement under the principle of a multi-wavelength interferometry. In this measurement, all synthetic wavelengths are taken into consideration, which are given by the distances between two arbitrary lines of the comb. The longest synthetic wavelength corresponds thereby to the distance of directly adjacent lines, and thus determines the unambiguous range of this partial measurement. The shortest synthetic wavelength is given by the entire optical bandwidth of the evaluated frequency comb spectrum.

The associated line spacings can assume values up into the THz range. Accuracies of under a micrometer can thus be achieved. If in addition the wavelength of a line of the comb is known, the distance can be determined from the detected measurement data on a third length scale, the unambiguous range and accuracy of which are given by the optical wavelength. In this way, the method can be complemented by an additional, very fine-scale measurement under the principle of the optical interferometry for particularly high precision requirements.

Additionally or alternatively to the distance measurement, particularly in the second partial measurement, the speed component of a moving measurement object parallel to the measurement beam can be obtained by measuring the Doppler shifts of spectral components of the detected superimposition signal.

In the measurement beam path, at least one moving measurement object can be contained. In the reference beam path, at least one stationary (that is, non-moving) reference object can be contained. The measuring method can further comprise a determining the speed component of the measurement object parallel to the measurement beam by means of the Doppler shifts of spectral components of the superimposition signal detected during the second measurement.

In principal, determining the speed component parallel to the measurement beam is also possible during the first partial measurement; a Doppler shift of discrete spectral components in the baseband is measured here also. However, the measured frequency changes are much smaller than in the second partial measurement because both frequency combs are subject to a Doppler shift. The anticipated frequency shifts due to motion are in the magnitude order of a few hertz. Thus, the detection requires a correspondingly long measuring time and very narrow-band laser sources (for example, mutually phase-coupled frequency combs), that is, an algorithm for numerical compensation of the relative phase jitter of the two comb sources.

The measurement object can be a measuring reflector, for example, which is contained in the measurement beam path. The reference object can be a fixed, that is, non-moving reference reflector, which is contained in the reference beam path.

With the described measurement method, particularly with the second partial measurement, wherein only the first frequency comb propagates via the measurement beam path and is reflected on the measurement object in order to then be superimposed with the second frequency comb propagated via the reference beam path, the relative speed of the measuring reflector with respect to the stationary reference object can be determined with sufficiently precise measurement of the Doppler shift of the light reflecting on the measurement object.

The Doppler shift of the n-th line of the frequency comb is thereby given by $$\Delta\omega_{Doppler,n} = \frac{v_{rel}}{c}\omega_n.$$

with $V_{rel}$ as relative speed between measuring and reference reflector, and $\omega_n$ as optical frequency of the n-th line of the frequency comb. With superimposition in the detector unit with the other frequency comb, electrical beat signals, the frequencies of which are shifted with regard to a reference measurement by exactly the amount of the speed-dependent Doppler shift. From this shift, with knowledge of the absolute optical wavelength (highly precise, for example, possible by referencing to an absorption cell or a self-referencing comb source), the (relative) speed can be determined using the above formula.

Since the Doppler shift is further dependent on the present optical frequency, that is to say, is somewhat different for each individual comb line, the relative speed can be determined from a linear fit, even without knowledge of the absolute optical frequencies. The information about the line spacing is sufficient for determining the speed. It can also be determined from the sign of the Doppler shift, in which direction the measurement object is moving. The above-described method for measuring the relative speed of at least one moving measurement object by means of two frequency combs can be used independently from the method for distance measurement. A further aspect of the invention relates therefore to a method for optically measuring the relative speed of at least one moving measurement object with regard to a stationary (that is, non-moving) reference object, comprising:

generating a first and a second frequency comb signal, wherein the first and the second frequency comb signal has with different line spacings;

superimposing a part of the first frequency comb signal reflecting on the measuring object with a part of the second frequency comb signal reflecting on the reference object, and detecting the superimposition signal;

determining the relative speed of the at least one measurement object with respect to the reference object from the Doppler shift of spectral components of the detected superimposition signal.

As already explained above, the first and the second measurement can be carried out successively in time. The measurement data for the first and the second measurement can be acquired immediately one after the other, by bringing the two frequency combs, that is, frequency comb signals to interference at the corresponding locations (in the reference beam path, in the measurement beam path, in front of the corresponding detection device), with the aid of an optical switch, for example.

The first and the second measurement can likewise be carried out simultaneously. The measurement data for the first and the second measurement can be collected at the same time, in that, for example, the first frequency comb signal propagates via the measuring arm, that is, the measurement beam path, whereas the second frequency comb signal is spectrally divided by an optical filter unit into a first portion and a second portion. For the first measurement, the first portion of the second frequency comb signal can be superimposed with at least one part of the first frequency comb signal, wherein the superimposition signal then propagates via the measurement beam path, and is subsequently captured/detected. For the second measurement, at least one part of the first frequency comb signal can only be brought to interference with the second portion of the second frequency comb signal after passing through the measuring arm, that is, the measurement beam path, and subsequently, the interference signal can be captured/detected.

The measuring data for the first and the second measurement can also be compiled at the same time by using a differential detector for the detection. For the first measurement, at least one part of the first frequency comb signal, and at least one part of the second frequency comb signal jointly propagate via the measurement beam path, are superimposed with another part of the second frequency comb, and are subsequently captured/detected by means of the differential detector. The sum signal of the differential detectors makes the evaluation of the first measurement possible, and the difference signal the evaluation of the second measurement.

The reference beam path can be completely contained in the measurement beam path, for example. The lengths of the reference route and the measuring route can be obtained separately, by carrying out a temporal windowing of the detected superimposition signal, a Fourier analysis of the spectrum of the superimposition signal, or an adjustment of a model function to the detected superimposition signal, or the spectrum thereof. In particular, the differentiation between the reference measurement and the actual measurement (of the first measurement and/or the second measurement) can be achieved by a suitable selection of time frames of the received superimposition signals. As an alternative or in addition thereto, the spectrum of the detected superimposition signal can be subjected to a discrete Fourier transform and thus, the distance information can be obtained separately from the reference signal and the measuring signal. A further option for separating the distance information is adjusting a model function to the detected superimposition signal, or the spectrum thereof.

With the method for distance measurement, the distances to several reflectors located in the measurement beam path, each of which reflecting a part of the emitted optical power back into the measuring system, can also be determined. In this way, the distances to several reflectors located in an expanded measurement beam can be determined with one single measurement. By means of a trilateration, the position of the measurement system relative to the reflectors can be determined therefrom.

The frequency comb sources used can be free-running frequency comb sources, that is, the frequency comb sources can be utilized for the distance and/or speed measurement without a separate stabilization with respect to one another.

A further aspect of the invention relates to a device for distance and/or speed measurement, in particular for optical distance and/or speed measurement, configured to carry out the method for distance and/or speed measurement according to the invention.

The method comprises a first and a second optical frequency comb source, configured to emit a first frequency comb signal and a second frequency comb signal, respectively, wherein the line spacings of the first frequency comb signal and the second frequency comb signal are different from one another. The device further comprises a reference beam path, a measurement beam path, and a detection device. The detection device is configured to detect superimposition signals of the frequency comb signals in the baseband. In particular, the detection device can be configured to detect superimposition signals of the two frequency comb signals in a time-resolved manner. The detection device can comprise one or more detector units, each capturing/detecting the (optical) superimposition signal propagated via the reference beam path, and the (optical) superimposition signal propagated via the measurement beam path (which prior to capturing, that is, prior to the detection can further be superimposed with an additional part of the first and/or the second frequency comb signal).

The device is configured such that at least one (first) part of the first frequency comb signal and one (first) part of the second frequency comb signal can be superimposed in the reference beam path, wherein the superimposition signal propagated via the reference beam path (that is, via the reference route) is detected by the detection device. Furthermore, at least one other (second) part of the first frequency comb signal and at least one other (second) part of the second frequency comb signal are superimposed and coupled into the measurement beam path. The superimposition signal propagated via the measurement beam path (that is, the measuring route) is detected by the detection device.

The frequency comb sources can be lasers, particularly mode coupled (femtosecond) lasers. These frequency comb sources generate frequency combs with smaller line spacings. The frequency comb sources can also be miniaturized frequency comb sources. These can be based, for example, on mode coupled laser diodes or non-linear optical interactions in micro resonators. Frequency comb sources such as these usually generate frequency comb signals with larger line spacings. Furthermore, frequency combs can be generated by way of time periodic modulation of a monochromatic optical signal. This can be done by integrated modulators. The use of silicon as a mutual integration platform for electronic and optical components is particularly advantageous in this context. The repetition rate of the frequency comb sources $$f_r = \frac{\omega_r}{2\pi}$$

(and thus the line spacing of the individual frequency combs) can, in principle, assume any desired values. Preferably, the repetition rate is between 50 MHz and 1 THz; further preferably between 1 GHz and 500 GHz, and particularly preferably between 10 GHz and 100 GHz. The difference of the repetition rates $$\Delta f_r = \frac{\Delta \omega_r}{2\pi}$$

of the two frequency comb signals is preferably between 1 kHz and 5 GHz, particularly preferably between 10 kHz and 500 MHz, and determines the line spacing of the detected electrical beat signal.

The wavelength of the frequency comb signals emitted by the frequency comb sources is preferably between 400 nm and 2000 nm, further preferably between 500 nm and 1700 nm, and particularly preferably between 1100 nm and 1700 nm.

In principle, the frequency comb sources do not need to be stabilized relative to one another. Important is only a mutual coherence time, which is greater than the measuring time for receiving a spectrum. This can be realistically achieved with the above-mentioned comb sources and the expected measuring rates. Spectrally viewed, the request to the laser sources is a relative line width of the individual comb lines to one another, which is smaller than the measuring rate. A slow mutual frequency drift of the lines can be backtracked by analyzing the detector signals, and with corresponding signal processing, does not restrict the distance measurement and optional speed measurement.

The splitting of the respective frequency comb signals, the coupling and superimposition of the individual frequency comb signals, or parts of the frequency comb signals as well as guidance of the frequency comb signals, or parts of the frequency comb signals, in the individual optical paths, that is, beam and detection paths of the device, can be achieved by means of suitable optical elements, like beam splitters, that is, power splitters, optical switches, optical filters, mirrors, lenses, etc., for example.

The device can further comprise a data processing unit configured to detect the path difference between the reference beam path and the measurement beam path from the detected superimposition signals. In particular, the path difference can be calculated from the relative phase positions of the superimposition signals, which can be determined by means of a spectral analysis of the detected superimposition signals (a Fourier analysis, for example). From the determined path difference, the distance to be measured to at least one measurement object can be determined. The data processing unit can comprise correspondingly programmed computers, specialized hardware and/or computer networks or computer systems, which carry out the corresponding calculations of the distance from the detected (electrical) signals. Furthermore, the data processing unit can comprise storage means, in which intermediate and end results are stored, and at least one graphical, preferably interactive, user interface (GUI) for outputting the determined distance data. The data processing unit can be in signal connection with the detection device.

The device can further be configured such that the superimposition signal propagated via the measurement beam path, that is, the measuring route, is superimposed with the portion of the second frequency comb signal supplied to the detection device, and is subsequently detected. In particular, this allows the simultaneous detection of the measuring data from the above-described first and second partial measurements (for example, with a differential detector).

In particular, the device can be configured such that the portion of the second frequency comb signal, which is supplied to the detection device, can be superimposed with the portion of the first frequency comb signal that propagated via the measurement beam path, wherein the superimposition signal is detected by the detection device. The device is thus suited to carry out multiscale distance measurements, wherein both the unambiguous range and the precision of the measurement can be increased.

As explained above, the device can comprise at least one beam splitter, a power splitter, an optical switch, a spectral filter and/or a circulator, in order to divert parts of the frequency comb signals, to guide them to the reference and/or measurement beam path, and to superimpose and/or bring to interference on the appropriate points in the reference beam path, the measurement beam path, and/or in front of or on the detection device. The device can further comprise other optical elements, for example, lenses, mirrors, spectral or spatial filters, modulators etc. The optical paths of the individual signals through the device for optical distance measurement can be configured differently.

In particular, the device can further comprise a branching unit configured to deliver, at least partially, at least one part of the second frequency comb signal to the measurement beam path, and at least partially to the detection device.

The division of at least one part of the second frequency comb signal into two further parts, which are delivered to the measurement beam path and the detection device, respectively, can be done by means of one or more optical power splitters, for example. Accordingly, the branching unit can comprise at least one power splitter, or can consist of a power splitter.

The division of at least one part of the second frequency comb signal into two further parts, which are delivered to the measurement beam path and the detection device, respectively, can also be done by means of an optical filter, which is configured to spectrally split at least one part of the second frequency comb signal into at least one first and one second spectral portion. The individual spectral parts can then be assigned to the different paths. Accordingly, the branching unit can comprise at least one optical (spectral) filter, or can consist of an optical (spectral) filter.

The division of at least one part of the second frequency comb signal into two further parts, which are delivered to the measurement beam path and the detection device, respectively, can also be done by means of one (or a plurality of) optical switches. In particular, the optical switch can be configured such that in a first position, at least one part of the second frequency comb signal is supplied to the measurement beam path, and in a second position, at least one part of the second frequency comb signal is supplied to the detection device. In this case, the individual measurements can be carried out successively in time. The detection device can comprise a differential detector, the output signals of which for the various settings of the switch can be read out separately. Accordingly, the branching unit can comprise at least one optical switch, or can consist of an optical switch.

The detection device can comprise several separate, that is, individual detectors (for example, photo diodes), and/or at least one differential detector, the sum and difference signals of which can be read out separately. The differential detector can comprise, for example, a coupler, two photo diodes, a subtraction unit and an addition unit for the electrical signals of the photo diodes. The sampling rate for the detection can preferably be between 500 kS/s and 30 GS/s, particularly preferably between 10 MS/s and 10 GS/s. The detection device can comprise two or more detector units, for example, wherein one of the detector units captures, that is, detects the superimposition signal during the reference measurement, and one of the detector units captures/detects the superimposition signals during the first and second measurement.

The detection device can further comprise amplifiers, filters, and other electronic components. The detection device can comprise analog-electrical signal processing units, for example, configured to process the signal prior to sampling and AD conversion.

The reference beam path can be entirely contained within the measurement beam path. This can be achieved by mounting, that is, arranging one or more semi-transparent mirrors in the reference beam path. The differentiation between the reference measurement and the actual measurement (the first measurement and/or the second measurement) can be achieved by a suitable selection of time frames of the captured superimposition signals. As an alternative, or in addition thereto, the spectrum of the detected superimposition signal can be subjected to a discrete Fourier transform and thus, the distance data from the reference signal and the measurement signal can be obtained separately. A further option for separating the distance data is the adjustment of a model function to the detected superimposition signal, or the spectrum thereof.

The device can be configured such that the emitted measuring beam, that is, the measuring signal impinges a plurality of reflectors, the distances thereof to the measurement system are determined in a measurement.

In addition to, or as an alternative to the distance measurement, the device can be configured for measuring the speed component of a moving measurement object parallel to the measuring beam.

Thus, the measurement beam path can contain at least one moving measurement object, and the reference beam path a stationary reference object. The device can further be configured such that at least one part of the first frequency comb signal propagates via the measurement beam path and is reflected on the measurement object; and the part of the first frequency comb signal reflecting on the measurement object is superimposed with a part of the second frequency comb signal propagated via the reference beam signal and reflecting on the reference object, wherein the superimposition signal is detected by the detection device.

The data processing unit can further be configured to determine the relative speed of the at least one measurement object with respect to the reference object from the Doppler shift of spectral components of the detected superimposition signal.

The measurement of the relative speed of at least one moving measurement object can be done independently from a distance measurement. A further aspect of the invention relates therefore to a device for the optical measurement of the relative speed of at least one moving measurement object with respect to a stationary (that is, non-moving) reference object, comprising a first optical frequency comb source configured to emit a first frequency comb signal;

a second optical frequency comb source configured to emit a second frequency comb signal, wherein the line spacings of the first frequency comb signal and the second frequency comb signal are different from one another;

a reference beam path containing a stationary reference object;

a measurement beam path containing at least one moving measurement object;

a detection device configured to detect superimposition signals of the frequency combs in the baseband;

a data processing unit, wherein the drive is configured such that at least one part of the first frequency comb signal propagates via the measurement beam path and is reflected on the measurement object;

the part of the first frequency comb signal reflecting on the measurement object is superimposed with a part of the second frequency comb signal propagated via the reference beam path and reflecting on the reference object, wherein the superimposition signal is detected by the detection device, and wherein the data processing unit is configured to determine the relative speed of the at least one measurement object with regard to the reference object from the Doppler shift of spectral components of the detected superimposition signal.

The method for distance measurement according to the invention and the associated device according to the invention can be used, for example, for measuring spatial coordinates under the principle of trilateration.

A further aspect of the invention relates to a system for measuring spatial coordinates of at least one measurement object, comprising at least two devices for (multiscale) distance measurements according to a preferred embodiment of the invention. The system is particularly configured to determine spatial coordinates of the at least one measurement object under the principle of trilateration from the distance data detected by the devices for (multiscale) optical distance measurement.

The method and the device for optical distance measurement and/or speed measurement according to the invention make distance measurements of high accuracy (for example, an accuracy of 100 nm) over, in principle, arbitrarily large distances up into the kilometer range possible. This is accomplished by the combination of various measuring principles in the same measurement device according to the invention. The method can be carried out with frequency comb sources with, in principle, arbitrarily large line spacings; thus, miniaturized sources with large-line spacing can also be considered.

The method and the device for optical distance measurement and/or speed measurement according to the invention can be used in all areas of the industrial measurement technology, particularly in the mechanical engineering and automobile manufacturing branch, and in the air and space industry. In particular, the invention can be used for high-precision measurements of large-volume components, and for monitoring production tolerances, for example, within a production line (Inline Measurement Technology), or in quality control. Since the invention makes the use of integrated frequency comb sources having a high robustness against mechanical effects possible, the method and the device according to the invention can be used directly within the industrial production line.

A precise distance measurement using the method and the devices according to the invention further allows the development of very precise CAD models and can be used for "Reverse Engineering", for example. Furthermore, the method and the device for distance measurement according to the invention can be used for the distance measurement between satellites in formation flying. Depending on the task of the satellites, precise knowledge of their relative position is necessary. Moreover, the introduction of miniaturized frequency comb sources having large line spacings in combination with the measuring method according to the invention allows decrease in size and costs reduction of measurement systems of this kind.

The device according to the invention can also be used, for example, as part of a coordinate measuring machine for referencing a probe head, or as main component of an optical coordinate measuring machine, and/or a position measuring machine. A further possible application is in the area of machine tool technology. These are currently still based on high-precision, thus very complex and costly kinematics. With the aid of a fast, reliable coordinate measuring system, more flexible, for example, robot-based kinematics can be put into operation, where the required precision is achieved by way of a corresponding control mechanism. In this context, the method and the device according to the invention can play an important role due to the high precision, robustness, and speed.

Figure 2:
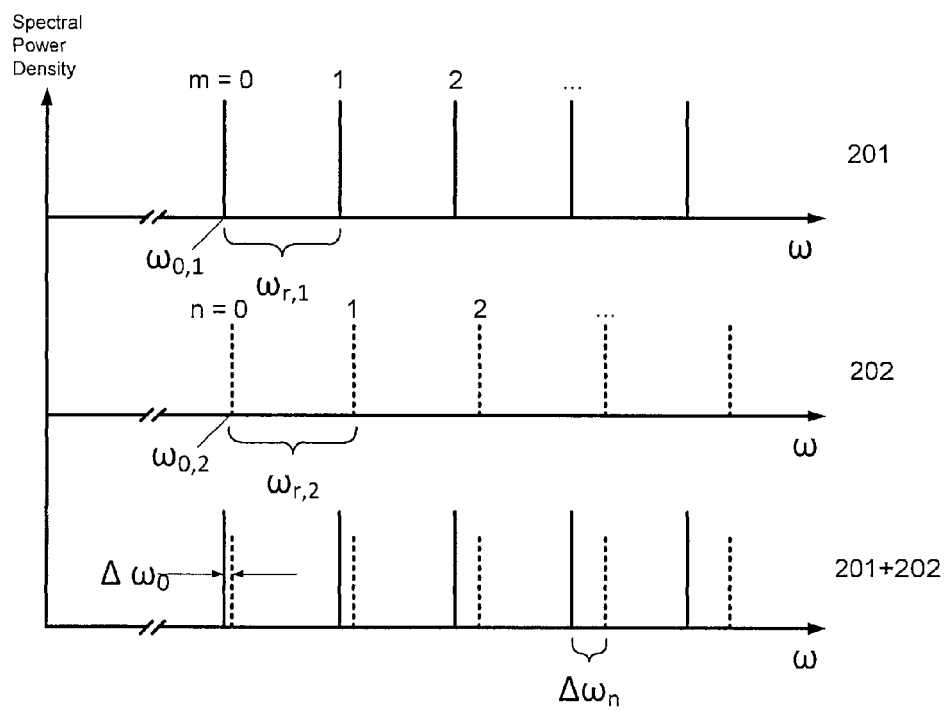
Figure 3:
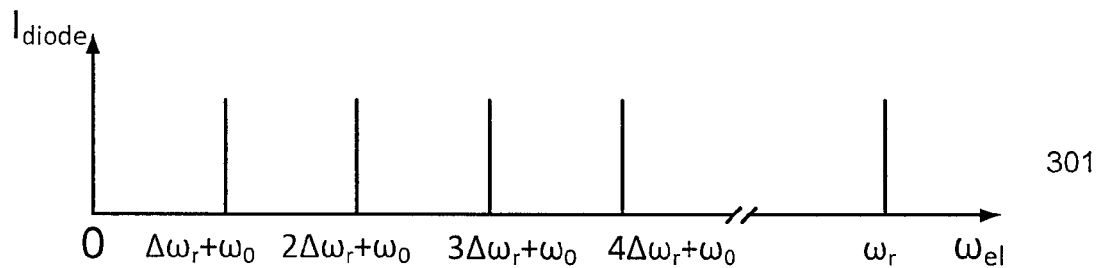
Figure 4:
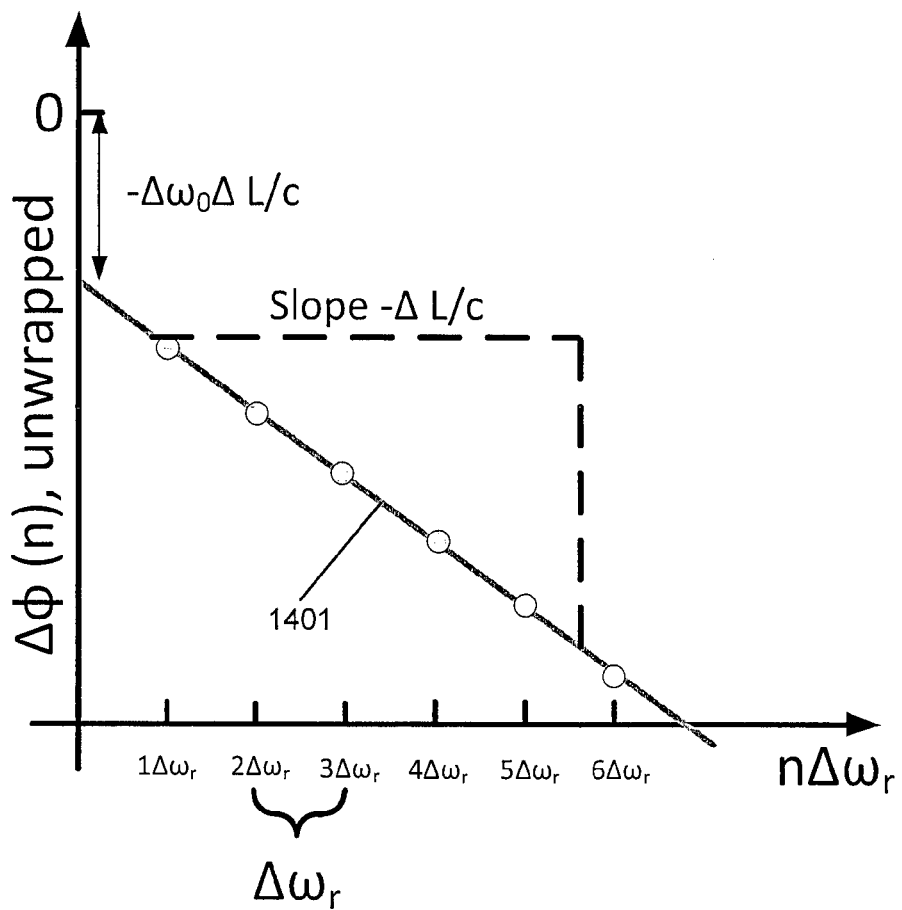
Figure 5:
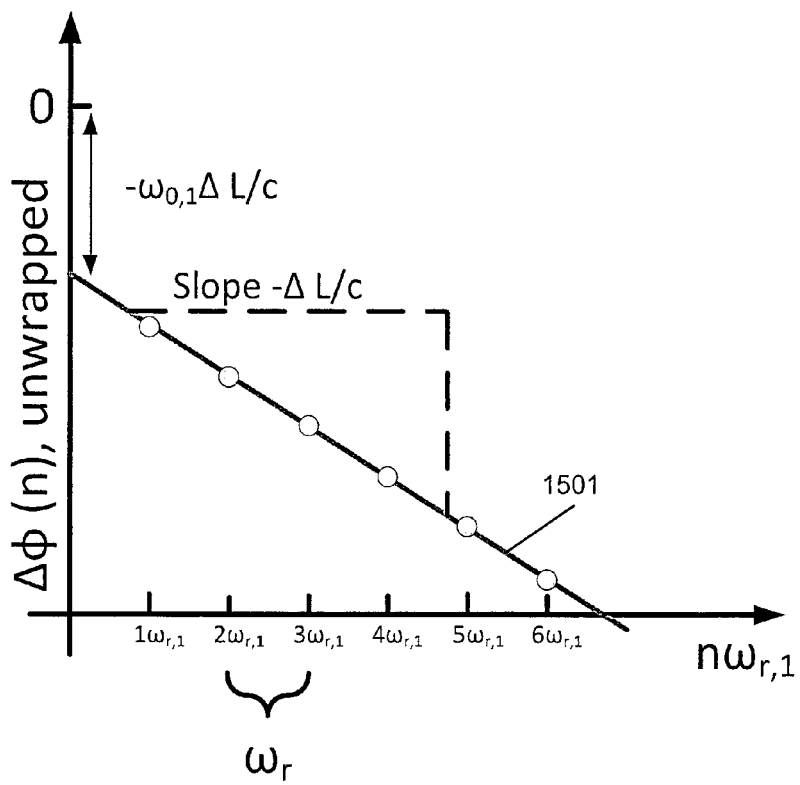
Figure 6:
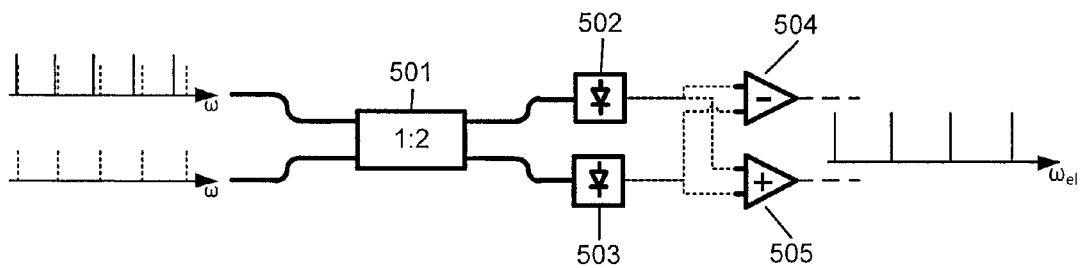
Figure 7:
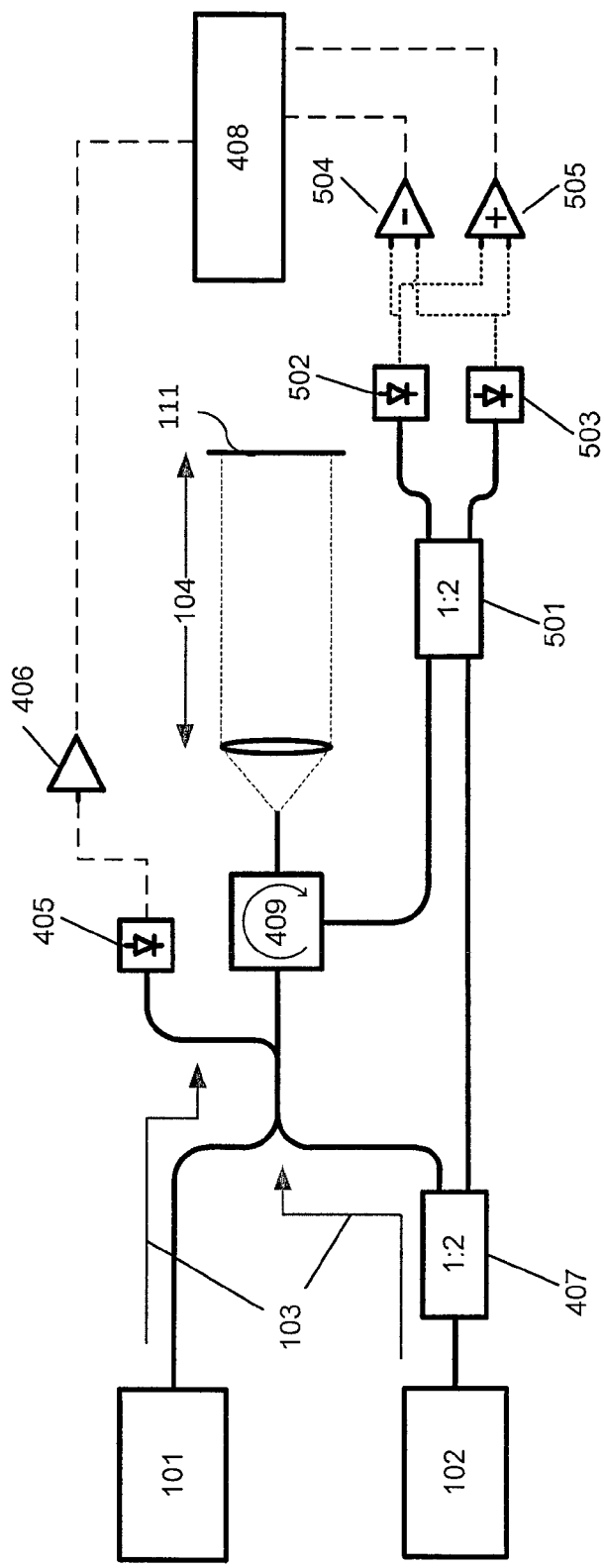
Figure 8:
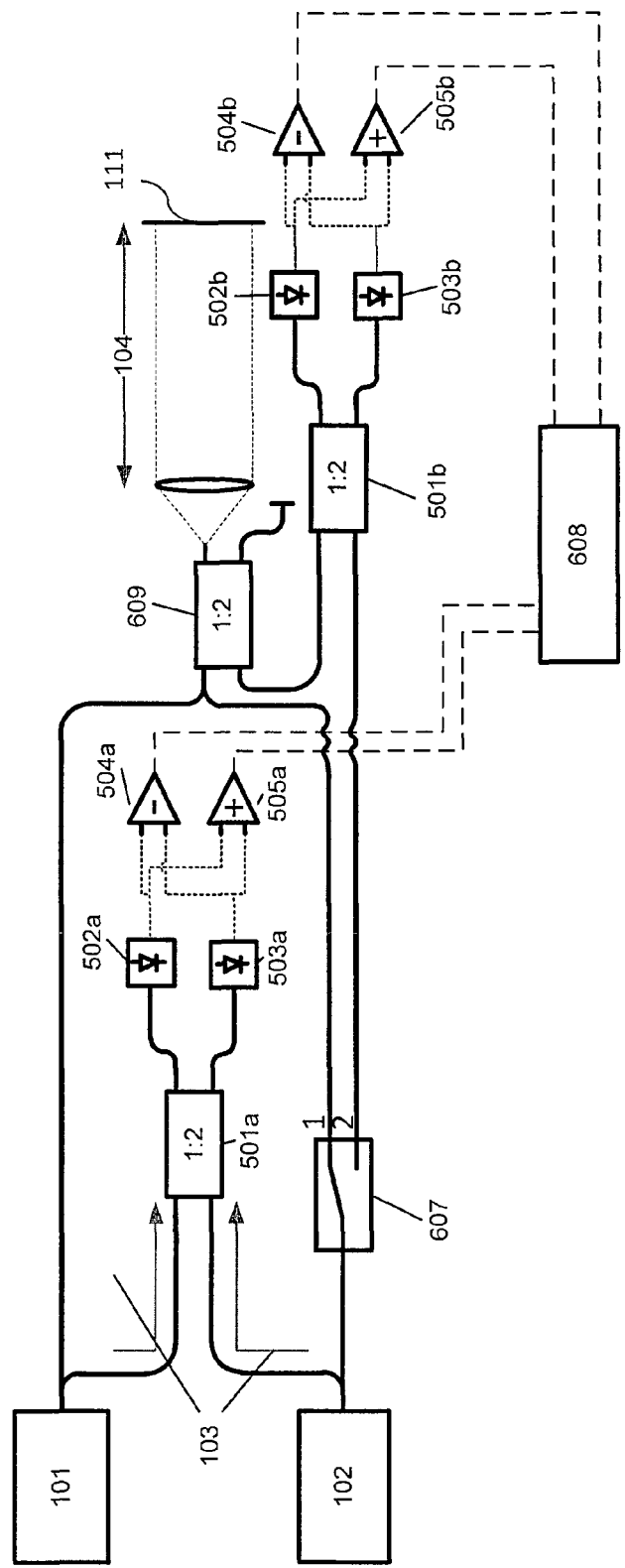
Figure 9:
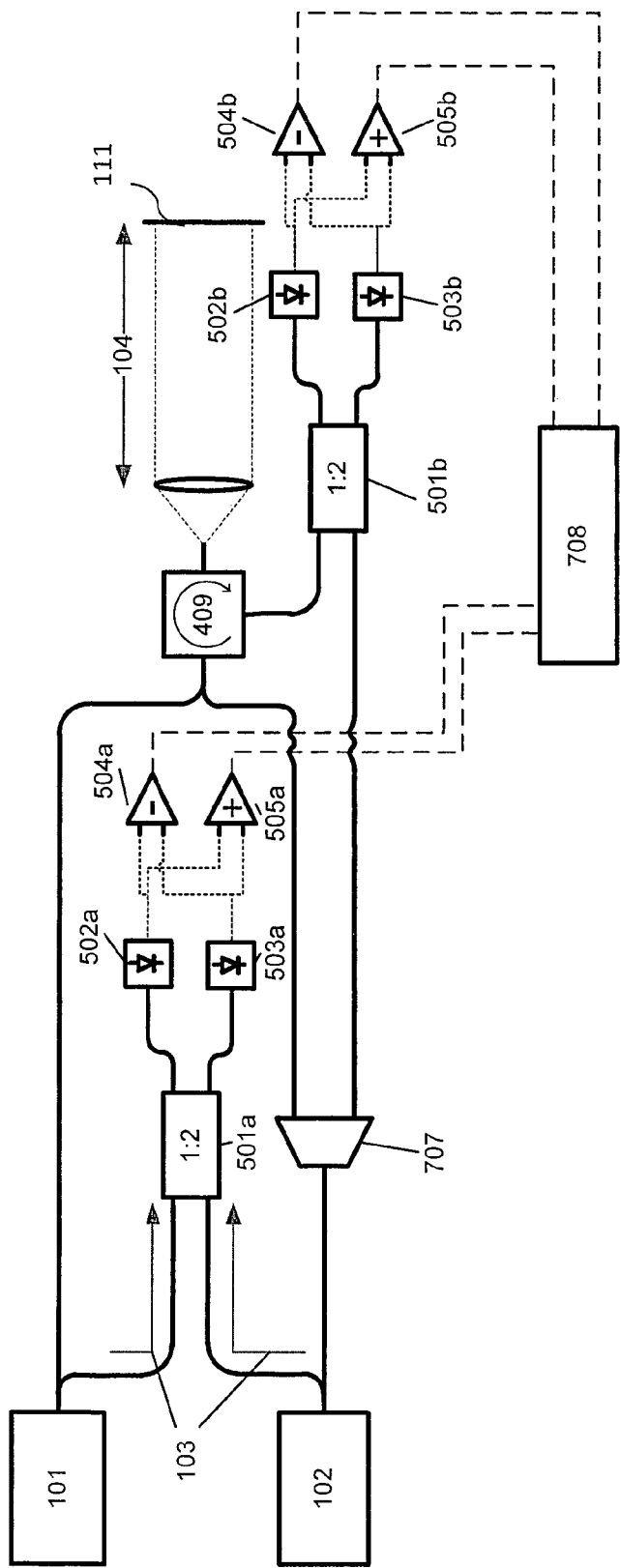
Figure 10:
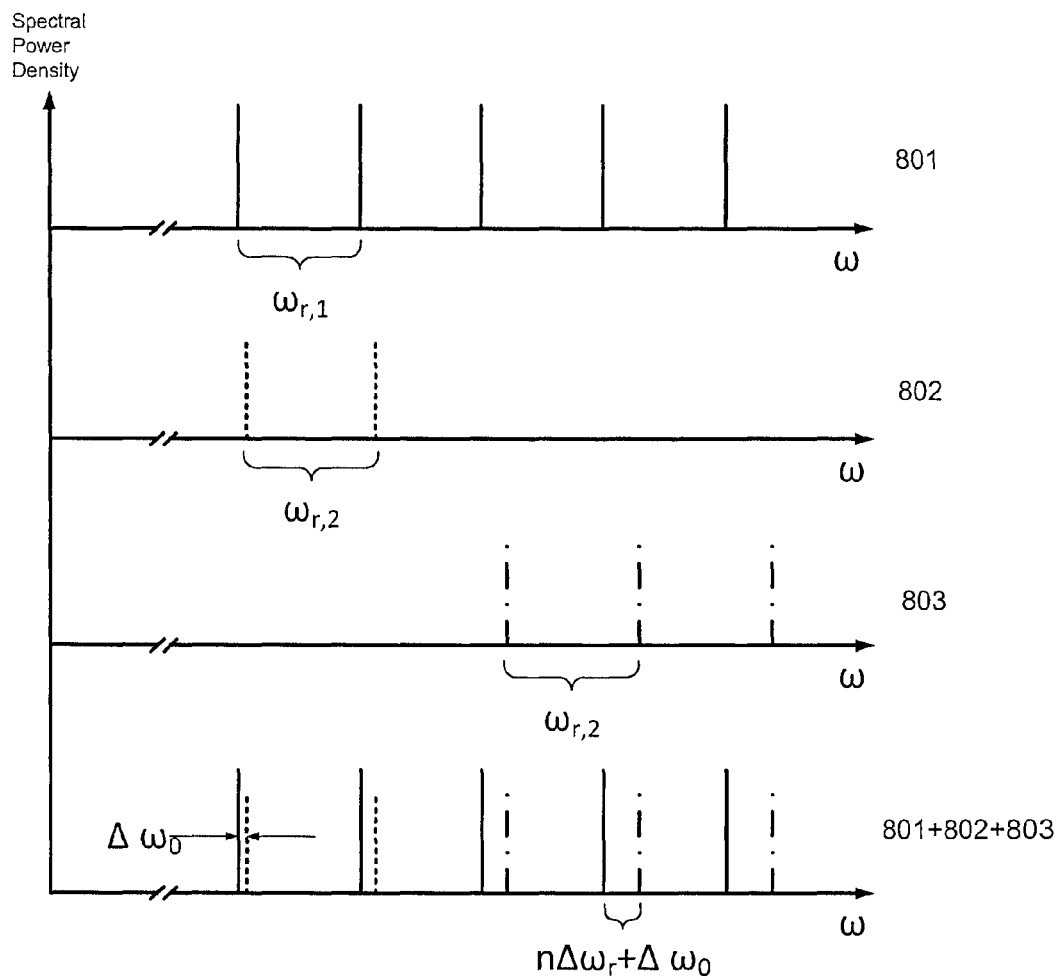
Figure 11:
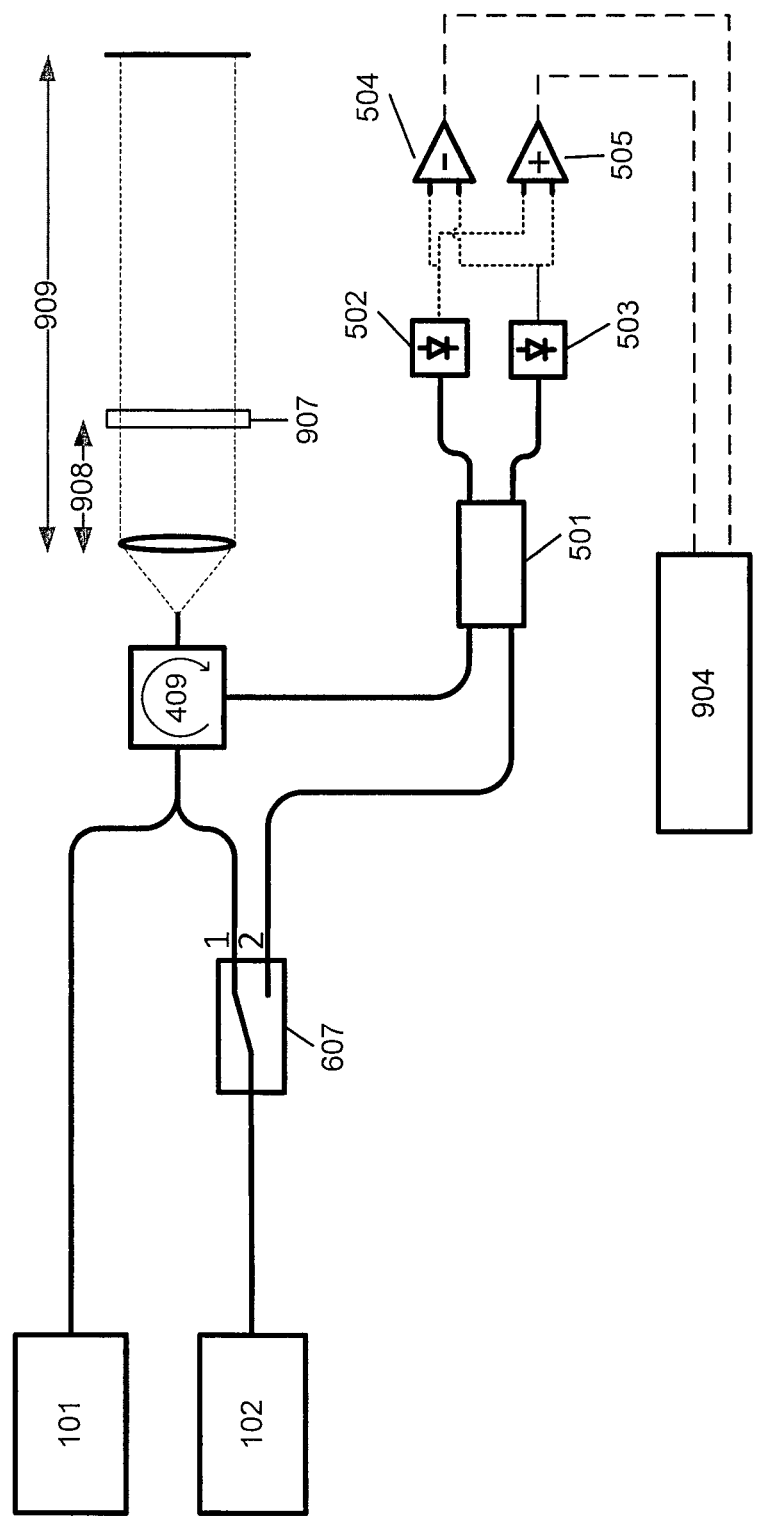
Figure 12:
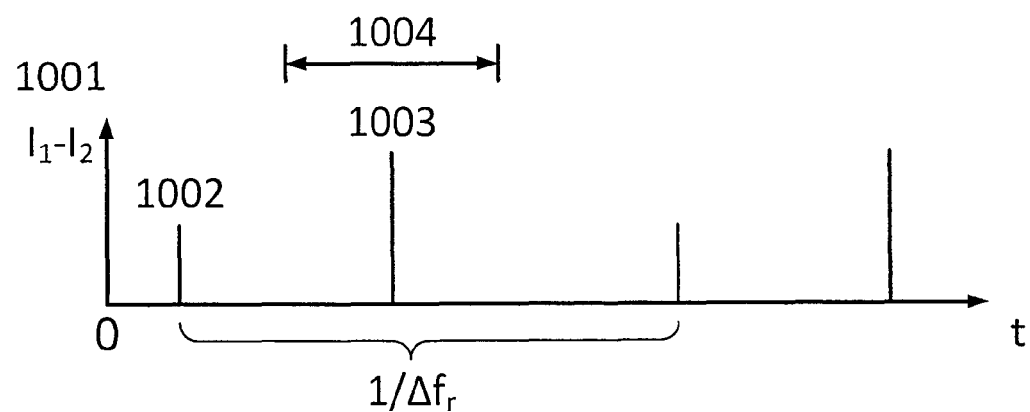
Figure 13:
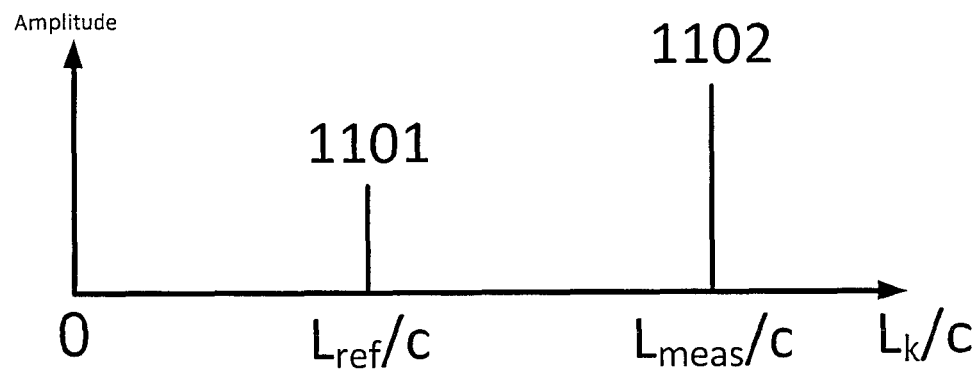
Figure 14:
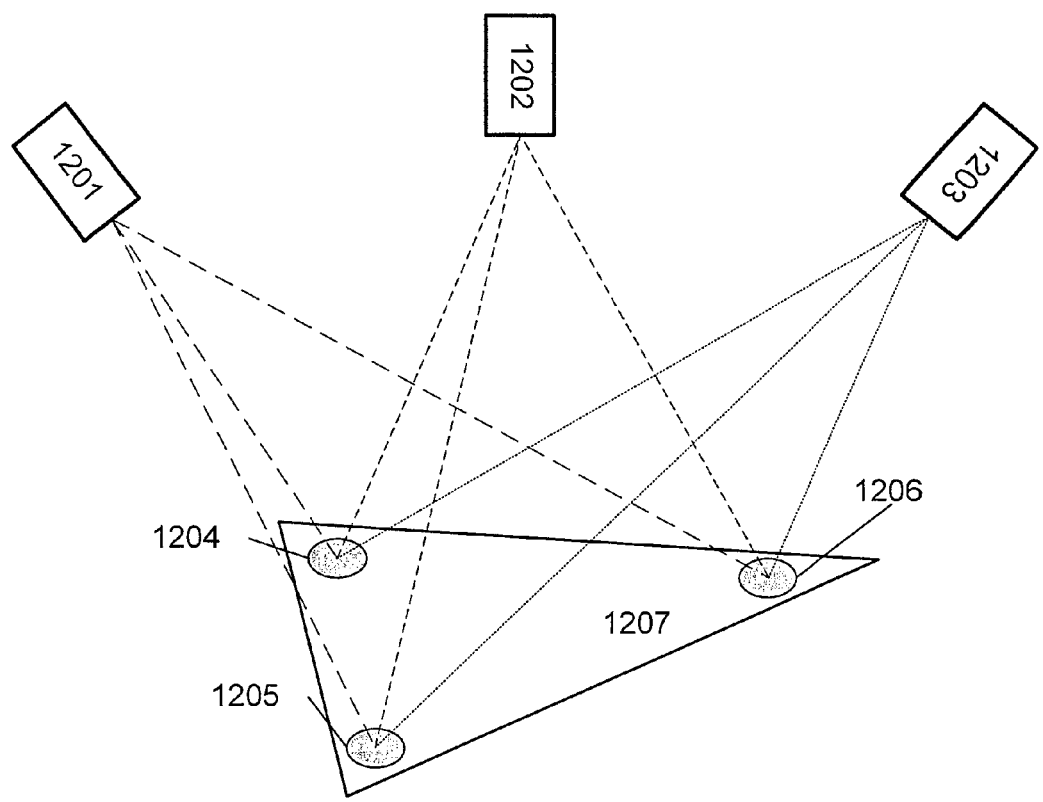
Figure 15:
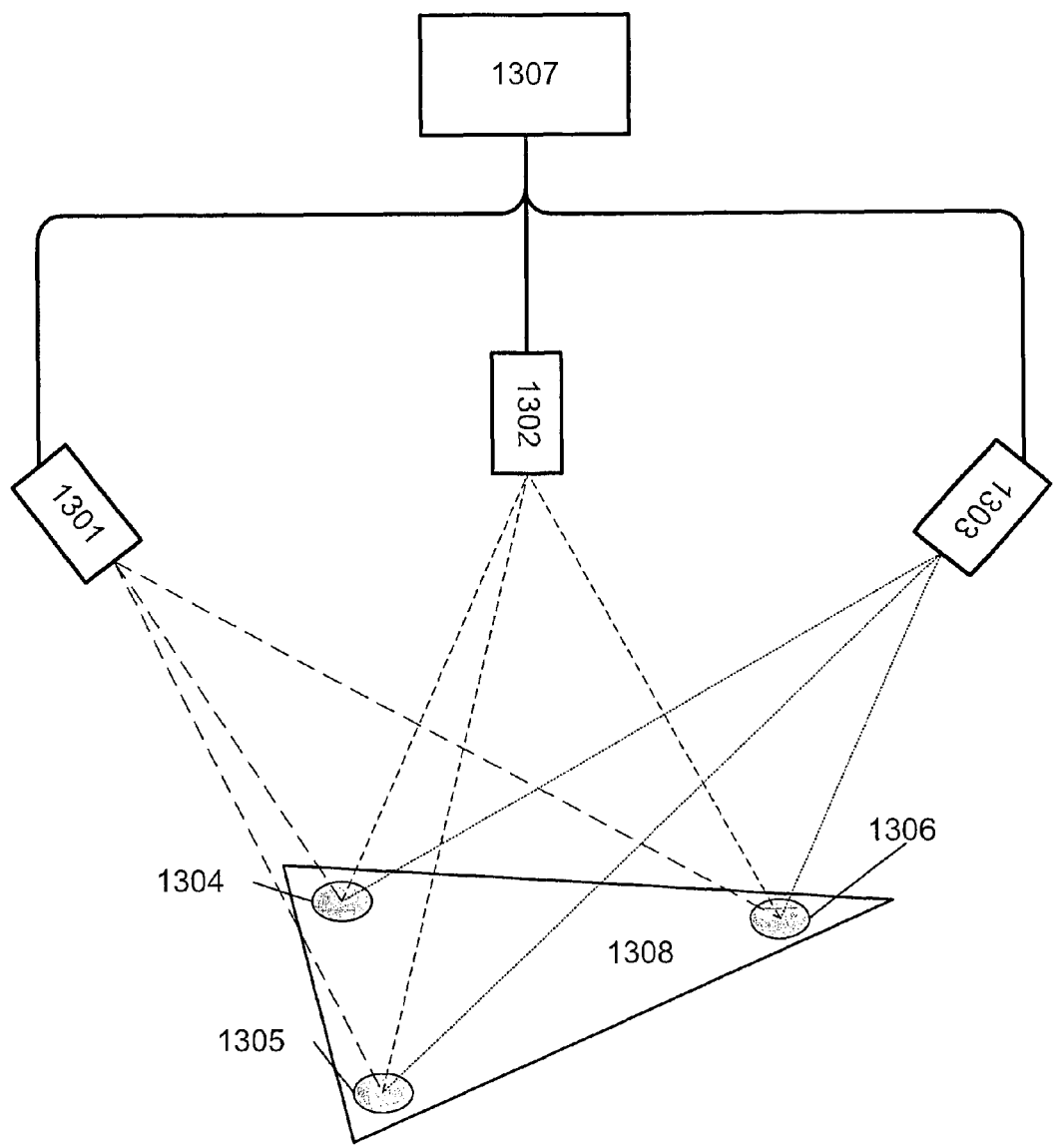
Figure 16:
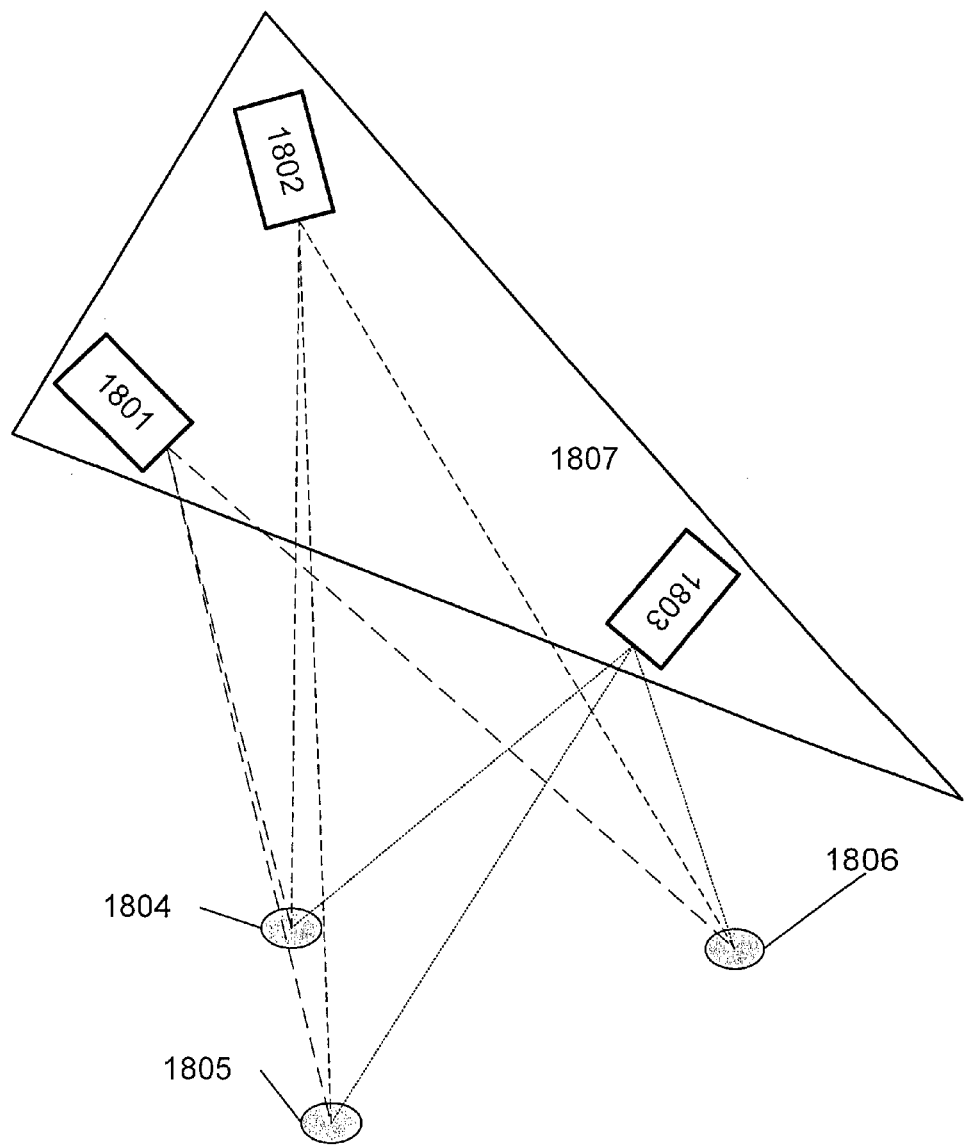
Figure 17:
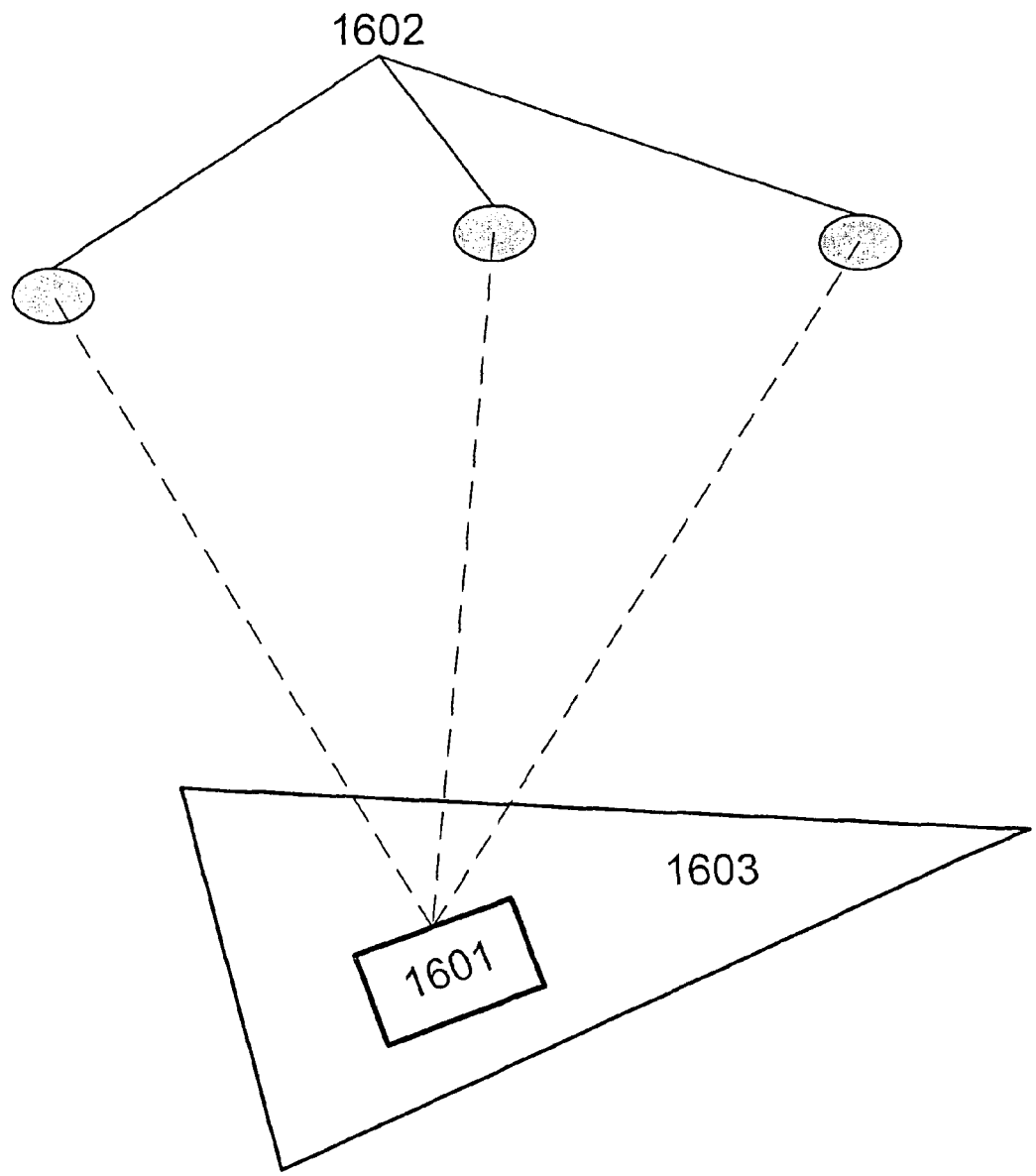
Figure 18:
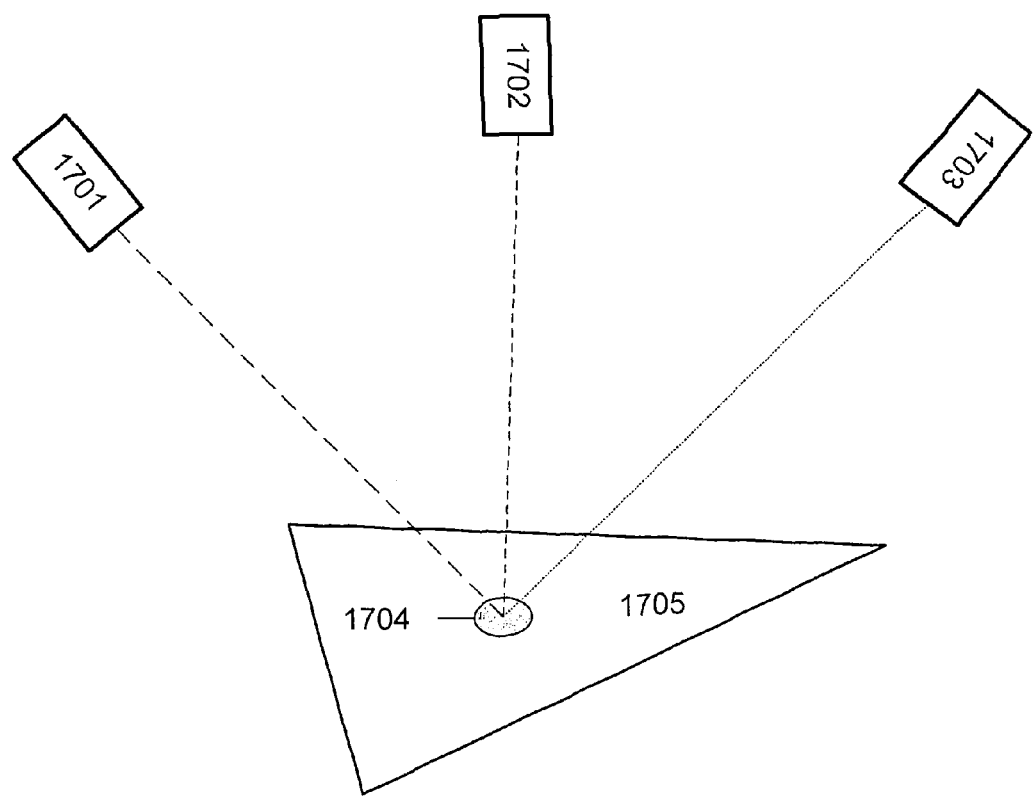
Figure 19:
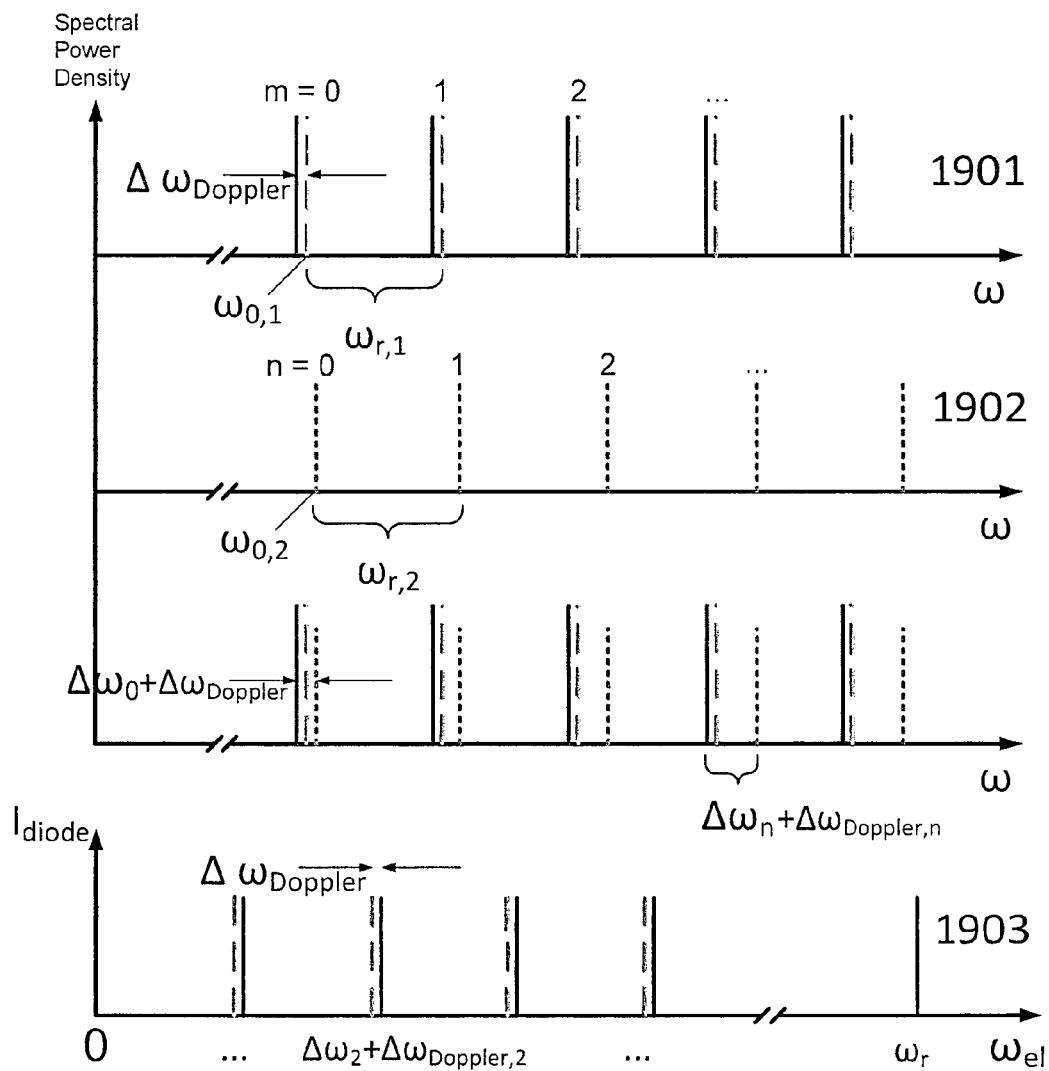
Figure 20:
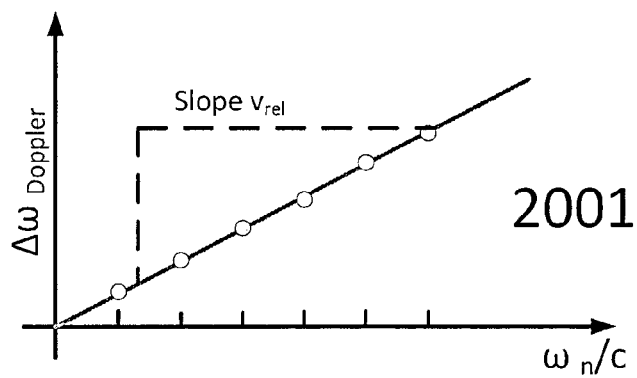

Further tasks, characteristics and advantages of the present invention will become apparent from the following detailed description of preferred embodiments of the present invention with reference to drawings, wherein is shown in:

FIG. 1 a device for distance measurement according to a first embodiment of the invention;

FIG. 2 the power density spectra of the respective signals emitted by the frequency comb sources, and the superimposition signal;

FIG. 3 the spectrum of the electrical beat signal;

FIG. 4 the phase difference $\Delta\Phi_I(n)$ determined in the first measurement;

FIG. 5 the phase difference $\Delta\Phi_{II}(n)$ determined in the second measurement;

FIG. 6 an exemplary differential detector;

FIG. 7 a device for distance measurement according to a second embodiment of the invention;

FIG. 8 a device for distance measurement according to a third embodiment of the invention;

FIG. 9 a device for distance measurement according to a fourth embodiment of the invention;

FIG. 10 the power density spectra of the respective signals emitted by the frequency comb sources and the superimposition signal during a measurement by means of a spectral separation of the signals;

FIG. 11 a device for distance measurement according to a fifth embodiment of the invention;

FIG. 12 the difference signal at the output of the subtraction unit in the device for distance measurement shown in FIG. 11;

FIG. 13 the amplitude of the signal from the Fourier analysis of the sum signal at the output of the addition unit in the device for distance measurement shown in FIG. 11;

FIG. 14 the basic construction of a system for measuring the coordinates of a measurement object according to a first embodiment;

FIG. 15 the basic construction of a system for measuring the coordinates of a measurement object according to a second embodiment;

FIG. 16 the basic construction of a system for measuring the coordinates of a measurement object according to a third embodiment;

FIG. 17 the basic construction of a system for measuring the spatial position of a measurement object according to a fourth embodiment;

FIG. 18 the basic construction of a system for measuring the spatial position of a measurement object according to a fifth embodiment;

FIG. 19 the power density spectra of the respective optical frequency comb signals emitted by the frequency comb sources, and the spectrum of the detected electrical superimposition signal as function of the frequency cod during a speed measurement;

FIG. 20 the Doppler shift of the individual lines as function of the respective frequency of the lines.

FIG. 1 shows an exemplary device for distance measurement according to a first embodiment of the invention. The device for distance measurement comprises the following components:

frequency comb sources 101 and 102,
reference beam path 103,
measurement beam path (route to be measured) 104, which contains a measurement object 111 (for example, measuring reflector),
detection device comprising two detector units 105 and 106,
optical branching unit 107,
data processing unit 108,
beam splitter element or circulator 109.

In the device for distance measurement as shown in FIG. 1, the measurement beam path 104 comprises the route to be measured, that is, the section between the last component of the device on the output side (the collimator lens in FIG. 1) and the measurement object 111.

Depending on the embodiment, the optical branching unit 107 can comprise, for example, an optical filter, and optical power divider, or an optical change-over switch. Each of the detector units 105 and 106 comprises at least one photo diode with corresponding control, or, for example, a differential detector as shown in FIG. 6. The device can also have further optical elements for dividing the respective frequency comb signals (for example, into the signals required for the reference measurement), for guiding the frequency comb signals or parts of the frequency comb signals in the individual optical paths, that is, beam or detection paths, for superimposing the individual frequency comb signals or parts of the frequency comb signals, etc. The optical elements can be beam splitters, that is, power splitters, optical switches, optical filters, mirrors, lenses, etc., for example, FIG. 2 shows the power density spectra (that is, the spectral power density as function of the frequency ω) of the optical frequency comb signals 201 and 202 emitted by the frequency comb sources 101 and 102, respectively, and the superimposition signal 201+202. FIG. 3 shows the spectrum $I_{diode}$ of the detected electrical superimposition signal 201+202 as function of the frequency $\omega_{e1}$.

For multiscale distance determination, two partial measurements can be carried out simultaneously or in short succession of one another, wherein, in contrast to the state of the art, in at least one of the partial measurements, both frequency combs 201 and 202 propagate simultaneously via the path 104 to be measured, and are subsequently detected (cf., for example, FIGS. 1 and 2). The produced electrical signal 301 is thereby provided with equidistant spectral components, the distance of which is equal to the difference of the line spacings of the two frequency combs, as shown in FIG. 3. The length of the route to be measured can be determined from the electrical phases of these beat signals. Since the difference of the line spacings of the two frequency combs can be arbitrarily small, even with large line spacings, an in principle arbitrarily large unambiguous range can be achieved, which is decoupled from the line spacing of the individual frequency comb signals.

A high measurement precision can be obtained with the second partial measurement. In this partial measurement, a beat signal is detected, which is produced from the superimposition of a frequency comb propagated via the measuring path (for example, at least one part of the signal 201) and a locally generated reference comb not propagated via the measuring path (for example, at least one part of the signal 202). The detection is done in a heterodyne manner by superimposing the two frequency combs on the detector 106. The distance to be measured can be determined from the phase of the beat signals. The unambiguous range is thereby defined by the line spacing of comb that propagates via the measuring path (for example, one part of the frequency comb signal 201). If the distance is already known with sufficient accuracy from the first partial measurement, the second partial measurement refines the measurement under the principle of a multi-wavelength interferometry with synthetic wavelengths, which correspond to the spacings of the lines of the frequency comb propagated via the measurement beam path and evaluated by means of the reference comb.

The line spacings evaluated for the synthetic wavelengths can assume values up into the THz range; thus, accuracies of under a micrometer can be achieved. If in addition the wavelength of a line of the comb 201 is known, the distance can be determined from the detected measurement data on a third length scale, the unambiguous range and accuracy of which are given by the optical wavelength. Thus, the method can be complemented by an additional, very fine-scale measurement under the principle of the optical interferometry for particularly high precision requirements.

In detail:

The frequency comb signals 201 and 202 (or frequency combs for short) emitted by the frequency comb sources 101 and 102 can be described by:

$$E_1(t) \text{Re}\left(\sum_m A_{1m} \exp[i(m\omega_{r,1} + \omega_{0,1})t]\right) \quad (1.1)$$

$$E_2(t) \text{Re}\left(\sum_n A_{2n} \exp[i(m\omega_{r,2} + \omega_{0,2})t]\right) \quad (1.2)$$

In the above formula, $E_1(t)$ denotes the electrical field of the first frequency comb signal;
$E_2(t)$ the electrical field of the second frequency comb signal;
$A_{1m}$ the amplitude of the m-th comb line of the first frequency comb signal;
$A_{2n}$ the amplitude of the n-th comb line of the second frequency comb signal;
$\omega_{r,1}$ the line spacing of the first frequency comb signal;
$\omega_{r,2}$ the line spacing of the second frequency comb signal;
m,n whole numbers.

The position of the individual comb lines is selected such that mutually corresponding lines of the first and second frequency comb (frequency comb 1 or frequency comb 2) are provided with the spacings $$\Delta\omega_n = n\Delta\omega_r + \Delta\omega_0 \text{ mit } \Delta\omega_r = \omega_{r,2} - \omega_{r,1} \text{ und } \Delta\omega_0 = \omega_{0,2} - \omega_{0,1}$$

which, compared to the line spacings $\omega_{r,1}$ and $\omega_{r,2}$ of the individual frequency combs are very small, as shown in FIG. 2.

The superimposition signal can be written as $$I_{beat,l}(t) = \text{Re}\left(\sum_n I_{n,l} \exp[i\Delta\omega_n t]\right), \quad (1.3)$$

with $I_{n,l} = RA_{1,n}A_{2n}^* \exp\left[-i\frac{\Delta\omega_n}{c}L\right]$ after jointly passing through distance L and the sensitivity of photo diode, $R.\underline{I}_{n,1}$ denotes the complex amplitude $\underline{I}_n$ from the Fourier analysis of the electric beat in the first partial measurement.

For simplicity's sake, it is referred therebelow to a first and a second (partial) measurement. This nomenclature, however, says nothing about any time sequence of the two partial measurements. In a temporally sequential measurement, the second partial measurement can be carried out prior to the first partial measurement. Likewise, both partial measurements can be done simultaneously.

First (Partial) Measurement:

In the first partial measurement, parts from both signals 201 and 202 are initially brought to interference in the beam splitter element 109, and subsequently propagate via the measurement beam path 104. This leads to phase changes $\varphi_{1m}$ and $\varphi_{2m}$ for the individual lines of frequency comb 201 and 202. The optical signal is square-detected on the detector unit 106. The resulting baseband signal contains portions with frequencies $\Delta\omega_n$, which are a result of the superimposition of corresponding lines of the two combs. An optional analog signal processing unit contained in the detector units 105 and 106 can serve for the processing the superimposition signal. The superimposition signal can be described with the above-mentioned formula 1.3.

The phases of the detected electrical beat signals (from the first partial measurement and the reference measurement) can be determined by means of a Fourier analysis. The phases determined by measurement techniques are thereby always in the range between 0 and $2\pi$. They can deviate by integer multiples v of $2\pi$ from the actual phases.

A comparison of the phases, which were accumulated over the measuring route 104 (that is, over the measurement beam path) and the reference route 103 (that is, over the reference beam path) with lengths $L_{meas}$ and $L_{ref}$ yields:

$$\Delta\Phi_{n,l} = \arg\{I_{n,l,meas}\}\text{mod}2\pi - \arg\{I_{n,l,ref}\}\text{mod}2\pi \quad (1.4)$$

$$= -\frac{\Delta\omega_n}{c}(L_{meas} - L_{ref}) + v2\pi$$

$$= -\frac{\Delta L_l}{c}n\Delta\omega_r - \Delta\omega_0\frac{\Delta L_l}{c} + v2\pi$$

For the reference measurement, the frequency comb signals (or at least parts of the frequency comb signals) are brought to interference in the reference beam path 103, and the superimposition/interference signal is detected by the detector unit 105. The superimposition signal can be described with the above-mentioned formula (1.3), wherein $L=\square\text{EMBED Equation.DSMT}+\square\square\square.$ FIG. 4 shows the phase difference $\Delta\Phi_1(n)$ determined in the first measurement as function of the factor $n\Delta\omega_r$. After determining v by means of a suitable algorithm ("unwrap"), the path difference between the measurement beam path and the reference beam path $\Delta L_1 = L_{meas} - L_{ref}$ can be calculated from a linear regression 1401, as shown in FIG. 4. Since the frequency offset $\Delta\omega_0$, that is, the difference of the line spacings $\Delta\omega_r$, can, in principle, be selected arbitrarily small, the maximal unambiguous range can be arbitrarily enlarged.

Second (Partial) Measurement

The second partial measurement can be carried out simultaneously with or (directly) after or prior to the first measurement. Initially, signal 201 thereby propagates individually via the measurement beam path 104 with the length $L_{meas}$, and is subsequently brought to interference with a part of the signal 202 (which until superimposition passes through a route 110 with the length $L_0$) from the optical branching unit 107, and is detected by the optical detector unit 106 (FIGS. 1 and 2). The superimposition signal can be written analogous to the first partial measurement as $$I_{beat,II}(t) = \text{Re}\left(\sum_n I_{n,II} \exp[i\Delta\omega_n t]\right), \quad (1.5)$$

wherein $$I_{n,II} = RA_{1,n}A^*_{2n}\exp\left[-\frac{i}{c}(L_{meas}(\omega_{0,1} + n\omega_{r,1}) - L_0(\omega_{0,2} + n\omega_{r,2}))\right],$$

and wherein R denotes the sensitivity of the photo diode.

In turn, the phases of the electrical beat signal can be determined by way of a Fourier analysis. The phases determined by measuring techniques are thereby always in the range between 0 and $2\pi$. They can deviate by integer multiples $v$ of $2\pi$ from the actual phases.

A comparison of the phases, which were accumulated via the measuring path 104 and the reference section 103 with lengths $L_{meas}$ and $L_{ref}$ yields:

$$\Delta\Phi_{n,II} = \arg\{I_{n,II,meas}\}\bmod 2\pi - \arg\{I'_{n,II,ref}\}\bmod 2\pi \quad (1.6)$$

$$= -n\omega_{r,1}\frac{\Delta L_{II}}{c} - \omega_{0,1}\frac{\Delta L_{II}}{c} + v2\pi.$$

Only one sole reference measurement (per partial measurement) is carried out thereby; both combs are superimposed here; the phases serve as reference for the partial measurements.

FIG. 5 shows the phase difference $\Delta\Phi_{11}(n)$ determined in the second measurement as function of the factor $n\Delta\omega_{r,1}$. After determining $v$ by means of a suitable algorithm ("unwrap"), $\Delta L_{11}$ can then be calculated with a linear regression 1501 from the slope, as shown in FIG. 5. The maximal unambiguous range is thereby given by $$L_{u,a} = \frac{\pi c}{\omega_{r,1}} \quad (1.7)$$

In principal, the length of the measurement beam path can be determined from the ordinate intercept with an accuracy that is equal to the accuracy of an interferometric measurement at a wavelength $$\lambda_{0,1} = \frac{2\pi c}{\omega_{0,1}}$$

Possible differences in the optical path lengths of the beam paths used in the respective individual measurements within the measurement device result in constant phase shifts of the detected signals. These influences disappear by means of a calibration measurement. The length difference to be measured is then $\Delta L_1 = \Delta L_{11} = \Delta L$. By sufficiently precise, simultaneous calculation of $\Delta L$ with the mentioned partial measurements, ambiguities of the absolute length can be avoided. In this way, an improved multiscale distance measurement can be attained.

The two partial measurements can be carried out simultaneously or successively in time. It is only necessary that the respective relevant phase positions of the baseband signals are detected separately from one another. This can be done, for example, in different ways, as described by example therebelow.

In order to evaluate the two partial measurements separately, two separate, that is, individual photo diodes can be used for detection, for example. As an alternative, a balanced, that is, a differential detector can be used.

FIG. 6 shows an exemplary balanced, that is, differential detector. The detector comprises a coupler, that is, a mixer 501, two photo diodes 502 and 503, a subtraction unit 504, and an addition unit 505 for the electrical signals of the photo diodes. The detector can likewise comprise other elements, like signal amplifiers, signal converters, filters etc., for example. The coupler 501 mixes, that is, combines the two optical input signals prior to detection so that the sum signal and the difference signal of the optical input signals can be evaluated separately.

The following applies for the sum and difference signal:

$$I_1(t)-I_2(t)=R(2Re(iE_1{}^*E_2')+2Re(iE_2{}^*E_2')) \quad (1.8)$$

$$I_1(t)-I_2(t)=R(|E_1|^2+|E_2|^2+|E_2'|^2+2Re(E_1E_2{}^*)) \quad (1.9)$$

$E_1$ thereby denotes the electrical field of frequency comb 201, $E_2$ the field of the part of the frequency comb 202, which is guided into the measurement beam path 104 by the optical branching unit 107, $E_2'$ the field of the part of the frequency comb 202, which is guided by the optical branching unit 107 directly to the detector unit 106, $I_1(t)$ denotes the electrical signal on photo diode 502, $I_2(t)$ the electrical signal on photo diode 503, and R the sensitivity of the photo diodes. The portion $2Re(iE_1{}^*E_2')$ on the difference signal supplies a constant component only, whereas $2Re(iE_1{}^*E_2')$ supplies the desired signal for the above-mentioned second partial measurement. Much the same applies to the sum signal, $2Re(E_1E_2{}^*)$ corresponds to the desired signal for the above-mentioned first partial measurement.

The sum signal of the two photo diodes 502 and 503 at the output of the addition unit 505 thus makes the evaluation of the electrical beat signals from the above-mentioned first partial measurement possible, during which signal 201 and a part of signal 202 jointly propagate via the measurement beam path. Correspondingly, the difference signal of the two photo diodes 502 and 503 at the output of the subtraction unit makes the evaluation of the second partial measurement possible, where only signal 201 propagates via the measurement beam path, and is only superimposed at the detector with another part of signal 202. In particular, as a result of the differential detection, those portions of the electrical beat drop from of the acquired signal, which were derived in the first partial measurement (in other words, superimposition of E1 and E2, and mutual propagation of both combs via the measurement beam path).

With the measuring method according to the invention, simultaneous measuring of the distances to partial reflectors, located at various distances in the beam path, is possible. On the one hand, this makes it possible to put the reference beam path entirely into the measurement beam path by way of a semi-transparent mirror, as is described in more detail thereafter in connection with FIG. 11. On the other hand, this allows the use of the measurement device for determining position and orientation of a measurement object provided with a plurality of retro reflectors in the space, which will be described in more detail thereafter in connection with FIGS. 14 to 18.

A simultaneous measurement of the distances to partial reflectors located at various distances in the beam path can be done, for example, as follows:

In a first partial measurement, the frequency comb 201 and a part of frequency comb 202 propagate via the measurement beam path 104. In the measurement beam path 104, several (for example, two) partial reflectors are located, each reflecting a part of the signals. Determining the respective distances to the various reflectors is done by way of a Fourier analysis of the sum signal in the data processing unit 108. The complex amplitudes $\underline{I}_n$ from the Fourier analysis of the electrical beat at the N discrete points $n\Delta\omega$ (see FIG. 3) are composed of the contributions of the various reflectors with the different spacings from the frequency comb source $L_1$ and $L_2$:

$$I_n = I_{n,1} e^{-i\frac{L_1}{c}\Delta\omega_n} + I_{n,2} e^{-i\frac{L_2}{c}\Delta\omega_n} \tag{1.10}$$

A Fourier transform of said amplitudes with respect to $\Delta\omega_n$ yields the characteristic peaks 1101 and 1102 for the reflections on the individual partial reflectors (see FIG. 13, for example). From the position of said peaks on the frequency axis, the lengths $L_1$ and $L_2$ can be determined.

For the second partial measurement, the frequency comb 201 propagates individually via the measurement beam path with the partial reflectors located therein, and is superimposed on the detection device with the other part of the frequency comb 202. The beat signals to be evaluated are included in the difference signal 1001 of the photo diodes (see FIG. 12, for example). A differentiation of the portions of the signal, which were reflected back by the various reflectors, can thereby be made by using a time frame 1004 prior to the further Fourier analysis in the data processing device 108. By cutting out the individual sections of various reflectors, a separate analysis of the information from the individual reflection events is possible. As an alternative, a Fourier analysis can also be done analogous to the evaluation of the first partial measurement.

FIG. 7 shows an exemplary device for distance measuring, wherein the two partial measurements can be carried out simultaneously. The device comprises two frequency comb sources 101 and 102, a power splitter 407, a circulator 409, and a detection device. The detection device comprises two detector units. The first detector unit comprises a photo diode 405, and (optionally) an electrical amplifier 406. The second detector unit is a balanced detector, as shown in FIG. 6. The device further comprises a branching unit configured to split the frequency comb signal emitted by the second frequency comb source 102 into at least two parts. The branching unit shown in FIG. 7 consists of an optical power splitter 407. However, the branching unit can also comprise other optical components, for example, additional power splitters, filters, lenses, mirrors, etc.

In the device for distance measurement as shown in FIG. 7, both signals of the balanced detector are used. The separation of the partial measurements carried out simultaneously by utilizing a power splitter is possible by way of evaluation of the sum signal 505 and the difference signal 504 of the photo diodes 502 and 503, as shown in FIG. 7. In particular, the distance measurement can be done as follows:

The signal 202 from frequency comb source 102 is divided into two parts on the power splitter 407. The division ratio can be 50:50 (3 dB power splitter), or a correspondingly selected other division ratio. A first part of the signal from frequency comb source 102 is brought to interference at the circulator 409 with a part of signal 201 from frequency comb source 101. Subsequently, both signals propagate via the measurement beam path 104. The other part of the signal 202 from frequency comb source 102 is brought to interference on the coupler 501 with the signals propagated via the measurement beam path 104. The photo diodes 502 and 503 detect the optical signal. The electrical signals of the photo diodes are evaluated as sum, that is, difference signal.

The difference of the electrical signals from the photo diodes 502 and 503 (that is to say, the signal at the output of the subtraction unit 504) includes the beat of the signal 201 from frequency comb source 101 after propagation via the measurement beam path with the partial signal from frequency comb source 102, which was guided to the detector unit on a direct path. The relative phase position of the beat to the reference measurement is described by formula (1.6). From a linear regression with the results of this partial measurement, the distance to be measured can, in principle, be determined with interferometrical precision using the data processing unit 408. The unambiguous range is given by formula (1.7). By using frequency comb sources having a repetition rate of about 10 GHz, the unambiguous range for this partial measurement is approximately 1.5 cm.

However, said unambiguous range is substantially enlarged by the other partial measurement. Thus, the sum of the electrical signals from the photo diodes 502 and 503 (that is, the signal at the output of the addition unit 505), includes the beat of the signal 201 from frequency comb source 101 after the propagation via the measurement beam path 104 with the partial signal from frequency comb source 102, which is likewise propagated via the measurement beam path. The relative phase position of the beat to the reference measurement is described by formula (1.4). From a linear regression with the results of this partial measurement, the distance to be measured can be determined. The accuracy to be achieved thereby is to be greater than the unambiguous range of the other partial measurement. The maximal unambiguous range is clearly enlarged since the measurement corresponds to a multi-wavelength interferometry with a large number of wavelengths (equal to the number of comb line pairs).

The signal of the reference measurement can be directly detected by means of the photo diode 405, and optionally, can be amplified by way of the electrical amplifier 406.

FIG. 8 shows a device for distance measurement according to another preferred embodiment. In this embodiment, the device is configured such that the two partial measurements can be carried out sequentially in time. The device for distance measurement comprises two frequency comb sources 101 and 102, a power splitter 501a, a first detector unit, a second detector unit, an optical switch, that is, a change-over switch 607, and a coupler 609. In this instance, the optical branching unit 107 consists of the optical switch 607. However, the branching unit can comprise additional optical components.

In the embodiment shown in FIG. 8, the first detector unit is a balanced detector having an optical coupler 501a, two photo diodes 502a and 503a, a subtraction unit 504a, and an addition unit 505a for the electrical signals of the photo diodes 502a and 503a. In addition, the first detector unit can comprise other components, for example, electrical amplifiers. The first detector unit can also be provided with only one sole photo diode. The first detector unit is configured to detect the superimposition signals in the reference measurement. With a balanced detector, the sum signal of the two photo diodes 502a and 503a allows the evaluation of the electrical beat signals from the reference measurement, where a part of the signal 201 and a part of the signal 202 jointly propagate via the reference beam path.

The second detector unit is also comprised of a balanced detector having an optical coupler 501*a*, two photo diodes 502*a* and 503*a*, a subtraction unit 504*a*, and an addition unit 505*a* for the electrical signals of photo diodes 502*a* and 503*a*. It goes without saying that the second detector unit can also comprise other components, for example, electrical amplifiers, signal converters, filters, etc.

The distance measurement can be carried out as follows:

At the optical change-over switch 607, the signal from frequency comb source 102 is first guided sequentially in time through the measurement beam path 104 for a first partial measurement (position 1 of switch 607), and subsequently for a second partial measurement (position 2 of switch 607) on a direct path for detection on the photo diodes 502*b* and 503*b*. However, the time sequence of the two partial measurements can be interchanged.

In the first partial measurement, the signal from the frequency comb source 102 is brought to interference on the coupler 609 with the signal from the frequency comb source 101. Subsequently, both signals propagate via the measurement beam path 104. Subsequently, the signals propagated via the measurement beam path 104 are detected. Since in this partial measurement, only the addition path outputs a relevant signal, the second detector unit can be provided with one single photo diode. The sum of the electrical signals from the photo diodes 502*b* and 503*b* includes the beat of the signal from the frequency comb source 101 after propagation via the measurement beam path with the partial signal from the frequency comb source 102, which is also propagated via the measurement beam path. The relative phase position of the beat to the reference measurement is described by formula (1.4). From a linear regression with the results of this partial measurement, the distance to be measured can be determined using the data processing unit 608. The maximal unambiguous range is thereby clearly enlarged because the measurement corresponds to a multi-wavelength interferometry with a large number of wavelengths (equal to the number of comb line pairs).

In the second partial measurement, the signal from the frequency comb source 102 is guided on a direct path to the second detector unit, and is there brought to interference on the coupler 501*b* with the signal from the frequency comb source 101 after propagation via the measurement beam path. The difference of the electrical signals from the photo diodes 502*b* and 503*b* includes the beat of the signal from frequency comb source 101 after propagation via the measurement beam with the partial signal from the frequency comb source 102, which was guided on a direct path to the detector unit. The relative phase position of the beat to the reference measurement is described by formula (1.6). From a linear regression with the results of this partial measurement, the distance to be measured can, in principle, be determined with interferometric precision. The significantly higher unambiguous range of the total measurement compared to a single interferometric measurement is determined by the first partial measurement.

In this embodiment, in which a temporally sequential acquisition of the two partial measurements takes place, there is no problem with the separation of the two partial measurements from the outset.

FIG. 9 shows a further exemplary device for distance measurement, in which the two partial signals from one of the two frequency comb sources are spectrally separated from one another. In this embodiment, the branching unit 107 comprises at least one optical filter 707, which brings about the spectral separation of the partial signals. The remaining components of the device for distance measurement shown in FIG. 9 correspond to the components of the device for distance measurement shown in FIG. 8, wherein in place of the coupler 609, a circulator 409 is used. The measurement can be carried out using the following method:

On the optical filter 707, the signal from the frequency comb source 102 is spectrally divided into a first portion 802 and a second portion 803. FIG. 10 shows the power density spectra (that is to say, the power density as a function of the frequency ω) of signal 801 emitted by the frequency comb source 101, of first portion 802, of second portion 803, and of the superimposition signal of all three signals 801+802+ 803.

For a first partial measurement, the first portion 802 of the spectrum propagates, together with the signal from the frequency comb source 101, via the measurement beam path. Simultaneously, the second part of the spectrum 803 is guided on a direct path to the coupler 501*b* for a second partial measurement, and is there superimposed with the signals from the measurement beam path. The allocation of the spectral portions to the various paths can also be done in modified form.

The beats resulting from the superimposition of the signals are detected on the photo diodes 502*b* and 503*b*. In the first partial measurement, the portion of the spectrum propagated via the measurement beam path 104 does not contribute to the difference signal of photo diodes 502*b* and 503*b*. The phase of the beat can be obtained from the sum signal. The determination of the measured distance is done by formula (1.4) from the phase correlation to the reference signal in the data processing unit 708. In the second partial measurement taking place simultaneously, the portion of the spectrum 803 that is guided directly to the detector unit does not contribute to the beat in the sum signal of the photo diodes. The phase of the beat can be obtained from the difference signal. The determination of the measured distance is done by formula (1.6) from the phase correlation to the reference signal in the data processing unit 708.

The spectral separation of the two partial signals makes it possible for the two partial measurements to be carried out simultaneously. With the detected electrical beat signal, the individual beat lines can thus be allocated to the respective partial measurement. Thus, a simple method can be chosen for the detection of the signals, for example, a direct detection using a photo diode. Although no detection with two photo diodes is necessary with this embodiment, such a detection is also possible.

FIG. 11 shows a device for distance measurement according to a fifth embodiment of the invention. In this embodiment, the reference beam path 908 is completely included in the measurement beam path 909. This can be brought about by using, that is, arranging a semi-transparent mirror 907 in the measurement beam path.

The differentiation between the reference measurement and the actual measurement can be made by way of the running time difference of the signals. With suitable selection of time frames in the data processing unit 904, or by a discrete Fourier transform of the complex amplitudes of the beat comb, the data from the reference signal and the measuring signal can be acquired separately.

The device for distance measurement comprises two frequency comb sources 101 and 102, a detector unit, a circulator 409, and an optical switch, that is, a change-over switch 607, and a transparent mirror. The detector unit can be a balanced detector (cf. FIG. 6), comprising an optical coupler 501, two photo diodes 502 and 503, a subtraction unit 504, and an addition unit 505 for the electrical signals of the photo diode 502 and 503.

The distance measurement can be carried out as follows:

On the optical change-over switch 607, the signal from the frequency comb source 102 is put at disposal for two partial measurements carried out sequentially in time. Replacing the change-over switch 607 with a power splitter or and optical filter is also possible. In this way, the two partial measurements can be carried out simultaneously.

In the first partial measurement, the signal from frequency comb source 101 propagates via the reference beam path 908 and measurement beam path 909. A portion of this signal is thereby reflected on the semi-transparent mirror 907. This portion supplies the reference signal. The semi-transparent mirror 907 can have a reflectivity of 0.1, for example, but other values are also possible. The other portion of the signal propagates via the entire measurement beam path and supplies the measurement signal.

For detection, the signals from the measurement beam path are brought to interference in the coupler 501 with the part of the signal from the frequency comb source 102 that was guided directly to the detector unit. The beat signals to be evaluated are included in the difference signal 1001 of the photo diodes 503 and 502, as shown in FIG. 12. A differentiation of the portions of signal 1002 from the reference beam path 908 and the signal 1003 from the measurement beam path 909 can thereby be made by using a time frame 1004 prior to further analysis in the data processing unit 904. Thus, a separate analysis of the data from reference signal and measuring signal is possible. The determination of the measured distance is done according to formula (1.6) from the phase correlation between reference signal and measurement signal.

In a second partial measurement carried out either sequentially in time or simultaneously, the signal from the frequency comb source 102 is brought to interference on the circulator 409 with the signal from the frequency comb source 101, and subsequently propagates via reference beam path and measurement beam path 908 and 909. A portion of the signals is thereby reflected on the semi-transparent mirror 907. This portion supplies the reference signal. The other portion of the signals propagates via the entire measurement beam path 908 and supplies the measurement signal. The detection takes place on the photo diodes 503 and 502. The beat signal to be evaluated is included in the sum signal of the photo diodes. A differentiation of the portions of the signal from the reference and measurement beam path can be made after a Fourier analysis in the data processing unit.

The complex amplitudes $\underline{I}_n$ from the Fourier analysis of the electrical beat at the N discrete points $n\Delta\omega$ (see FIG. 3) are composed of the contributions of the various reflectors with the different spacings of the frequency comb source $L_{ref}$ and $L_{meas}$:

$$\underline{I}_n = I_{n,ref} e^{-i\frac{L_{ref}}{c}\Delta\omega_n} + I_{n,meas} e^{-i\frac{L_{meas}}{c}\Delta\omega_n} \quad (1.11)$$

A Fourier transform of these amplitudes with respect to $\Delta\omega_n$ yields the characteristic peaks 1101 and 1102 for the reflections on the individual partial reflectors, as shown in FIG. 13. From the position of these peaks on the frequency axis, the measured distance can be determined.

ADDITIONAL EMBODIMENTS

A further exemplary arrangement for multiscale optical distance measurement (see FIG. 1) comprises two optical frequency comb sources 101 and 102, which emit signals 201 and 202 with different line spacings $\omega_{r,1}$ and $\omega_{r,2}$; at least one optical detector unit 105 or 106, which is suited to detect superimposition signals 301 (see FIG. 3) of the frequency combs in the baseband; a reference beam path 103, in which the signals 201 and 202 (see FIG. 2) are brought to interference and the superimposition signal is detected by the detector unit 105; a measurement beam path 104; and optical branching unit 107; a data processing unit 108, and an optical beam splitter element 109. The signal 201 emitted by the frequency comb source 101 is propagated via the measurement beam path. The optical branching unit 107 supplies the signal 202 emitted by the frequency comb source 102 at least partially to the measurement beam path, and at least partially to the detector unit 106. The portion of the signal 202 supplied to the detector unit 106 is superimposed with the signals propagated via the measurement beam path. The data processing unit 108 carries out a spectral analysis of the electrical signal emitted by the detector unit 106, and extracts therefrom the route difference between the reference beam path and the measurement beam path.

An exemplary method for multiscale distance measurement comprises the following steps, which can be carried out sequentially in time or simultaneously: Superimposition of the signals 201 and 202 in the reference beam path 103 and detecting the interference signal; superimposition of the signal 201 and a part of signal 202, and subsequent coupling into the measurement beam path 104; superimposition of the signal propagated via the measurement beam path 104 with a further part of the signal 202, and subsequent detection of the superimposition signal; spectral analysis of the detected superimposition signals and extraction of the route difference between reference beam path and measurement beam path from the relative phase positions.

The optical branching unit 107 can comprise a power splitter 407 (see FIG. 7). The detector unit 106 can comprise several separate detectors or a differential detector, with which sum and difference signal can be read-out separately (see FIG. 6). The detector units 105 and 106 can comprise analog-electrical or discrete signal processing units, which process the signal prior to sampling and AD conversion.

The optical branching unit can comprise an optical switch 607 (see FIG. 8). The detector unit 106 can comprise a differential detector, the output signals of which are read out separately for the different positions of the switch 607. The optical branching unit can comprise an optical filter 707 (see FIG. 9).

The measuring data for the first and the second measurement can be acquired one immediately after the other in that the signals 201 and 202 are brought to interference at the corresponding points with the aid of an optical switch 607.

The measuring data for the first and the second measurement can be collected at the same time, wherein the signal 201 propagates via the measuring arm/measurement beam path, whereas the signal 202 is spectrally divided into a first portion 802 and a second portion 803 by way of an optical filter unit 707 (cf. FIG. 9). For the first measurement, the first portion 802 is initially superimposed with signal 801, then propagates via the measurement beam path 104, and is subsequently detected by the second detector unit, whereas for the second measurement, signal 801 is only brought to interference with the second portion 803 after passing through the measuring arm/measurement beam path and is detected by the second detector unit.

The reference beam path 908 can be completely contained in the measurement beam path 909 (see semi-transparent mirror 907 in the reference beam path, FIG. 11). The differentiation between reference measurement and actual measurement can be made by way of the running time difference of the signals. By suitable selection of time frames in the data processing 904, or by discrete Fourier transform of the complex amplitudes of the beat comb, the data from reference signal and measurement signal can be acquired separately.

The described distance measurement systems and methods can be used for measuring spatial coordinates under the principle of trilateration.

The device and the method for multiscale distance measurement according to the invention can be used for measuring spatial coordinates, that is, for measuring the position and/or the orientation of measurement objects under the principle of trilateration. Various configurations are thereby possible, which differ in the measuring setup.

A first possible configuration for position determination in the space provides for the placing of a mobile transmitter (for example, a miniaturized frequency comb source) of the measurement object, and for a distance measurement relative to at least three stationary reflectors (see FIG. 17, for example). Three distances are thereby detected, from which the spatial position of the transmitter with respect to the reflectors can be determined. Another configuration for position determination in the space provides for the measurement of the distances between several (for example, three) stationary transmitters to a reflectors placed on the measurement object (see FIG. 18, for example). There are likewise three distances detected in this case, from which the spatial position of the reflector with respect to the three transmitters can be determined.

In order to determine the position and orientation of an object in the space (six degrees of freedom), the measuring of at least six distances between several, at least three stationary transmitters and several, at least three reflectors with known relative position is necessary, as shown in FIG. 14. By way of an over-determination (for example, nine distances between three reflectors and three transmitters), the accuracy can be improved. Another configuration for determining the position and orientation of the measurement object provides for the distance measurement between several (at least three) transmitters of known relative positions, and several (at least three) stationary reflectors, as shown in FIG. 16. By way of an over-determination (for example, nine distances between three reflectors and three transmitters), the accuracy can be improved in this case as well.

FIG. 14 shows the principal construction of an exemplary system for measuring the coordinates, that is, the spatial position and orientation of a measurement object based on a measurement of the distances to several partial reflectors. The system comprises three distance measuring units 1201, 1202, and 1203. Each of the distance measuring units can be constructed like one of the devices for distance measurement according to an embodiment of the invention. Each of the distance measuring units 1301, 1302, and 1303 comprises two frequency comb sources, that is, frequency comb generators. The frequency comb sources can be fed from a mutual frequency comb unit 1307, as shown in FIG. 15. The measurement object 1207 (FIG. 14) or 1308 (FIG. 15) is provided with three retro-reflectors 1204, 1205, and 1206 (FIG. 14), or retro reflectors 1304, 1305, and 1306 (FIG. 15). The frequency comb generators comprised in each of the distance measuring units illuminate the three retro reflectors 1204, 1205, and 1206 (FIG. 14), or retro reflectors 1304, 1305, and 1306 (FIG. 15). With the above-described method for distance measurement, particularly for distance measurement to several reflectors in the beam path, the nine distances of the retro reflectors can be determined by the respective distance measuring units. By way of trilateration, the spatial position and orientation of the measurement object 1207 or 1308 (which are totally determined by six independent parameters) are thus over-determined, and can therefore be reliably measured. With suitable evaluation of the redundant data, a coarse measurement of the distances on the largest length scale can be dispensed with, entirely or in part.

FIG. 16 shows the principle construction of another exemplary system for measuring the spatial position and orientation of a measurement object. In this system, at least three, preferably miniaturized distance measuring units 1801, 1802, 1803 of known relative positions are mounted on the measurement object 1807. Each of the measuring units 1801-1803 can be constructed like one of the devices for distance measurement according to an embodiment of the invention. The distances to at least three stationary reflectors 1804, 1805, and 1806 are measured using one of the above-described methods for distance measurement. By way of the over-determination of the position and orientation of the measurement object 1807 resulting from the nine measured distances, the measuring accuracy can be improved by applying suitable algorithms.

FIG. 17 shows the principle construction of a third exemplary system for measuring the spatial position of a measurement object. If the determination of the position of a measuring object 1603 in the space sufficient, a measurement set-up is feasible, in which a distance measuring unit 1601 placed on the measurement object 1603 determines the distance to at least three stationary retro reflectors 1602 according to one of the method for distance measurement described above. From the three measured distances, the position of the distance measuring unit 1601 can be determined by trilateration. If more reflectors are utilized for the measurement, it can be used from increasing the measurement accuracy. The distance measuring unit 1601 can be constructed like one of the devices for distance measurement according to an embodiment of the invention.

FIG. 18 shows the principle construction of a fourth exemplary system for measuring the spatial position of a measurement object. With this system, the position of a measurement object 1705 can also be determined. The system comprises three distance measuring units 1701, 1702, and 1703. Each of the distance measuring units 1701-1703 can be constructed like one of the devices for distance measurement according to an embodiment of the invention. The three distance measuring units 1701, 1702, and 1703 illuminate a retro reflector 1704 placed on the measurement object 1705. From the three measured distances to the retro reflector according to one of the above-described methods for distance measurement, the position of the retro reflector 1704 can be detected.

With the above-described measurement devices, an optical measurement of the relative speed of at least one moving measurement object with respect to a stationary (that is to say, non-moving) reference object can also be carried out. The measurement object 111 contained in the measurement beam path 104 can thus be a moving object, for example, and moving measurement reflector. The reference beam path 103 can contain a stationary (that is, non-moving) reference object. The part of the first frequency comb signal 201 reflecting on the measurement object 111 can be superimposed with a part of the second frequency comb signal 202 propagated via the reference beam path 103 and reflecting on the reference object, wherein the superimposition signal is detected by the detection device 106. By means of the Doppler shift of spectral components of the detected superimposition signal, the relative speed of the moving measurement object with respect to the stationary reference object can be determined, as described above.

FIG. 19 shows the power density spectra (that is to say, the spectral power density as function of frequency ω) of the optical frequency comb signals 1901 and 1902 respectively emitted by the frequency comb sources 101 and 102, and the spectrum $I_{diode}$ of the detected electrical superimposition signal 1903 as function of the frequency $\omega_{e1}$. The signal 1901 propagated via the measurement beam path has thereby been reflected by the moving measuring reflector 111, and is therefore provided with a Doppler shift. Upon detection, the Doppler shift is reflected with the unchanged signal 1902 (reference comb signal) in the electrical signal 1903, and can be used for determining the relative speed.

FIG. 20 shows the Doppler shift of the individual lines as function of the respective frequency of the lines. The speed can be determined by way of a linear fit 2001 from the slope of the straight line.

LIST OF REFERENCE NUMERALS

101, 102 frequency comb sources
103, 908 reference beam path
104, 907 measurement beam path
105, 106 detector units
107 optical branching unit
108, 408, 708, 904 data processing unit
109 beam splitter or circulator
110 distance/path covered from one part of one of the two frequency comb signals to the detector unit
111 measurement object
201, 202 frequency combs/frequency comb signals
301, 801, 802 electrical signal (beat signal)
406 amplifier
407 optical power splitter
409 circulator
501*a, b* coupler and/or mixer
405, 502*a,b*, 503*a,b* photo diodes
504 subtraction unit
505 addition unit
607 optical switch
609 coupler/mixer
707 optical filter
907 semi-transparent mirror
1001 difference signal of photo diodes 502 and 503
1002 signal from the reference beam path
1003 signal from the measurement beam path
1004 time frame
1101, 1102 characteristic peaks for the reflection on individual partial reflectors
1601 mobile transmitter
1207, 1308, 1603, 1705, 1807 measurement object
1201-1203, 1701-1703 stationary transmitters/frequency comb units
1301-1303, 1601, 1701-1703, 1801-1803 distance measuring units
1307 frequency comb unit
1204-1206, 1304-1306, 1704, reflectors
1602, 1804-1806 reflectors
1801-1803 transmitters/frequency comb units
1901 frequency comb signal with Doppler shift
1902 frequency comb signal (reference comb)
1903 electrical beat signal with Doppler shift
2001 linear fit for determining the relative speed from the Doppler shift

The invention claimed is:

1. A method for optical distance measurement, comprising:
generating a first and a second frequency comb signal, wherein the first and the second frequency comb signal is provided with different line spacings;
a reference measurement comprising superimposing at least one part of the first frequency comb signal and at least one part of the second frequency comb signal in a reference beam path comprising a reference distance, and detecting the superimposition signal propagated through the reference distance;
a first measurement comprising superimposing at least one other part of the first frequency comb signal on at least one other part of the second frequency comb signal, coupling the superimposition signal into a measurement beam path comprising a distance to be measured, and detecting the superimposition signal propagated through the distance to be measured; and
determining a path difference between the reference beam path and the measurement beam path from the detected superimposition signals.

2. A method according to claim 1, wherein determining the path difference comprises a spectral analysis of the detected superimposition signals, and determining the relative phase positions of selected spectral components of the detected superimposition signals; and wherein the path difference between the reference beam path and the measurement beam path is determined from the determined relative phase positions.

3. A method according to claim 1, wherein the superimposition signal propagated via the measurement beam path is superimposed with a third part of the second frequency comb signal prior to detection.

4. A method according to claim 1, further comprising a second measurement, wherein the second measurement comprises coupling at least one part of the first frequency comb signal into the measurement beam path, superimposing the part of the first frequency comb signal propagated via the measurement beam path on a part of the second frequency comb signal propagated via the reference beam path, and detecting the superimposition signal.

5. A method according to claim 4, wherein
at least one moving measurement object is present in the measurement beam path; and
at least one stationary reference object is present in the reference beam path, and
wherein the method further comprises:
determining a speed component of the measurement object parallel to the measurement beam via Doppler shifts of spectral components of the superimposition signal detected during the second measurement.

6. A method according to claim 4, wherein the first and the second measurement are carried out successively in time.

7. A method according to claim 4, wherein the first and the second measurement are carried out simultaneously.

8. A method according to claim 1, wherein the reference beam path is completely contained in the measurement beam path, wherein the lengths of the reference beam path and the measurement beam path are obtained separately in that a temporal windowing of the detected superimposition signal, a Fourier analysis of a spectrum of the superimposition signal, or an adjustment of a model function to the detected superimposition signal, or the spectrum thereof, is carried out.

9. A method according to claim 1, wherein a plurality of reflectors is contained in the measurement beam path, the distances of which to the measurement system are determined in a measurement.

10. A method according to claim 1, wherein frequency comb sources generate the first and second frequency comb signal, and wherein the frequency comb sources comprise free-running frequency comb sources.

11. A device for optical distance measurement, comprising:
a first optical frequency comb source that emits a first frequency comb signal;
a second optical frequency comb source that emits a second frequency comb signal, wherein line spacings of the first frequency comb signal and the second frequency comb signal are different from one another;
a reference beam path comprising a reference distance;
a measurement beam path comprising a distance to be measured;
a detection device that detects superimposition signals of the frequency combs in a baseband;
wherein the device is configured such that
at least one part of the first frequency comb signal and one part of the second frequency comb signal are superimposed in the reference beam path, wherein the superimposition signal propagated through the reference distance is detected by the detection device; and
at least one other part of the first frequency comb signal and at least one other part of the second frequency comb signal are superimposed and are coupled into the measurement beam path, wherein the superimposition signal propagated through the distance to be measured is detected by the detection device.

12. A device according to claim 11, further comprising a data processing unit that determines a path difference between the reference beam path and the measurement beam path from the detected superimposition signals.

13. A device according to claim 11, wherein the device is further configured such that a portion of the second frequency comb signal supplied to the detection device is superimposed with at least one part of the first frequency comb signal propagated via the measurement beam path, wherein the resulting superimposition signal is detected by the detection device.

14. A device according to claim 11, further comprising a branching unit that supplies at least one part of the second frequency comb signal at least partially to the measurement beam path, and at least partially to the detection device.

15. A device according to claim 14, wherein the branching unit comprises
at least one optical power splitter and/or
at least one optical filter that spectrally splits at least one part of the second frequency comb signal into at least one first and one second portion.

16. A device according to claim 14, wherein the branching unit comprises at least one optical switch, wherein in a first position of the optical switch, at least one part of the second frequency comb signal is supplied to the measurement beam path, and in a second position of the optical switch, at least one part of the second frequency comb signal is supplied to the detection device.

17. A device according to claim 16, wherein the detection device comprises a differential detector, and wherein output signals for a different position of the optical switch can be read out separately.

18. A device according to claim 11, wherein the detection device comprises several separate detectors and/or at least one differential detector, a sum and difference signal of which can be read out separately.

19. A device according to claim 11, wherein the reference beam path (908) is completely contained in the measurement beam path.

20. A device according to claim 11, wherein the emitted measurement beam impinges a plurality of reflectors, the distances of which to the measurement system are determined in a measurement.

21. A device according to claim 12, wherein
the measurement beam path contains at least one moving measurement object; the reference beam path contains a stationary reference object,
wherein the device is further configured such that:
at least one part of the first frequency comb signal propagates via the measurement beam path and is reflected on the measurement object; and
the part of the first frequency comb signal reflected on the measurement object is superimposed with a part of the second frequency comb signal propagated via the reference beam path and reflected on the reference object, wherein the superimposition signal is detected by the detection device, and
wherein the data processing unit determines a relative speed of the at least one measurement object with respect to the reference object via a Doppler shift of spectral components of the detected superimposition signal.

22. A system for measuring spatial coordinates of at least one measurement object, comprising at least one device for distance measurement according to claim 11.

23. Use of the method according to claim 1 for the measurement of spatial coordinates of at least one measurement object.

* * * * *